United States Patent
Yoo et al.

(10) Patent No.: US 12,519,944 B2
(45) Date of Patent: Jan. 6, 2026

(54) IMAGE OR VIDEO CODING BASED ON TRANSFORM SKIP- AND PALETTE CODING-RELATED ADVANCED SYNTAX ELEMENT

(71) Applicant: LG Electronics Inc., Seoul (KR)

(72) Inventors: Sunmi Yoo, Seoul (KR); Jungah Choi, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 17/765,979

(22) PCT Filed: Oct. 5, 2020

(86) PCT No.: PCT/KR2020/013481
§ 371 (c)(1),
(2) Date: Apr. 1, 2022

(87) PCT Pub. No.: WO2021/066609
PCT Pub. Date: Apr. 8, 2021

(65) Prior Publication Data
US 2022/0353506 A1 Nov. 3, 2022

Related U.S. Application Data

(60) Provisional application No. 62/911,223, filed on Oct. 5, 2019.

(51) Int. Cl.
*H04N 19/52* (2014.01)
*H04N 19/103* (2014.01)
(Continued)

(52) U.S. Cl.
CPC ......... *H04N 19/132* (2014.11); *H04N 19/176* (2014.11); *H04N 19/18* (2014.11); *H04N 19/70* (2014.11)

(58) Field of Classification Search
None
See application file for complete search history.

(56) References Cited

U.S. PATENT DOCUMENTS

| 2015/0373327 A1 | 12/2015 | Zhang et al. |
| 2016/0234498 A1* | 8/2016 | Misra ............... H04N 19/46 |

(Continued)

FOREIGN PATENT DOCUMENTS

| KR | 20160031495 | 3/2016 |
| KR | 20170140145 | 12/2017 |

(Continued)

OTHER PUBLICATIONS

Bross et al., "Versatile Video Coding (Draft 5)," JVET-N1001-v10, Presented at Joint Video Experts Team (JVET) of ITU-T SG 16 WP 3 and ISO/IEC JTC 1/SC 29/WG 11, 14th Meeting: Geneva, CH, Mar. 19-27, 2019, 407 pages.

(Continued)

*Primary Examiner* — Lindsay J Uhl
(74) *Attorney, Agent, or Firm* — Fish & Richardson P.C.

(57) ABSTRACT

According to the disclosure of the present document, dependency conditions can be defined for efficiently parsing/signaling syntax elements having dependency on transform skip- and/or palette coding-related information, and, on the basis of the dependency conditions, whether or not to parse the transform skip- and/or palette coding-related information can be determined. Accordingly, bits that need to be signaled for video/image coding can be reduced, and coding efficiency can be improved.

3 Claims, 15 Drawing Sheets

(51) Int. Cl.
*H04N 19/124* (2014.01)
*H04N 19/132* (2014.01)
*H04N 19/169* (2014.01)
*H04N 19/176* (2014.01)
*H04N 19/18* (2014.01)
*H04N 19/70* (2014.01)

(56) References Cited

U.S. PATENT DOCUMENTS

| | | | |
|---|---|---|---|
| 2016/0269730 A1 | 9/2016 | Jeon et al. | |
| 2021/0006794 A1* | 1/2021 | Karczewicz | H04N 19/103 |
| 2022/0070461 A1* | 3/2022 | Zhang | H04N 19/127 |
| 2022/0141495 A1* | 5/2022 | Kim | H04N 19/12 375/240.26 |
| 2022/0295068 A1* | 9/2022 | Kang | H04N 19/119 |
| 2022/0312033 A1* | 9/2022 | Kim | H04N 19/61 |

FOREIGN PATENT DOCUMENTS

| | | |
|---|---|---|
| KR | 101837040 | 3/2018 |
| WO | WO2018174357 | 9/2018 |
| WO | WO2019112394 | 6/2019 |

OTHER PUBLICATIONS

Chen et al., "Algorithm description for Versatile Video Coding and Test Model 6 (VTM 6)," JVET-O2002-v2, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 89 pages.

Office Action in Indian Appln. No. 202217022806, dated Aug. 24, 2022, 6 pages.

Office Action in Indian Appln. No. 202217027393, dated Sep. 15, 2022, 4 pages.

Office Action in Korean Appln. No. 10-2022-7011605, dated Aug. 30, 2022, 15 pages (with English translation).

Chao et al., "Non-CE8: Minimum QP for escape mode in palette," JVET-P0474, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 3 pages.

Yoo et al., "CE8-related : Unified condition between BDPCM and transform skip," JVET-O0206_v1, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.

* cited by examiner

IMAGE OR VIDEO CODING BASED ON TRANSFORM SKIP- AND PALETTE CODING-RELATED ADVANCED SYNTAX ELEMENT

CROSS-REFERENCE TO RELATED APPLICATIONS

This application is a National Stage application under 35 U.S.C. § 371 of International Application No. PCT/KR2020/013481, filed on Oct. 5, 2020, which claims the benefit of U.S. Provisional Application No. 62/911,223, filed on Oct. 5, 2019. The disclosures of the prior applications are incorporated by reference in their entirety.

BACKGROUND OF THE DISCLOSURE

Field of the Disclosure

The present technology relates to video or image coding, and for example, to an image or video coding technology based on a high-level syntax element related to transform skip and palette coding.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

Further, there is a need for a scheme for improving the overall image/video coding efficiency by efficiently classifying whether to code related information in accordance with dependency and non-dependency of information which is absolutely necessary or auxiliary used in performing transform skip and palette coding.

SUMMARY

A technical subject of the present document is to provide a method and an apparatus for enhancing video/image coding efficiency.

Another technical subject of the present document is to provide a method and an apparatus for efficiently parsing/signaling transform skip and/or palette coding related information.

Still another technical subject of the present document is to provide a method and an apparatus for efficiently determining whether to perform coding in accordance with dependency and/or non-dependency of information being used during transform skip and/or palette coding.

Yet still another technical subject of the present document is to provide a method and an apparatus for defining a dependent condition for effectively parsing a syntax element having dependency with respect to a transform skip and/or palette coding related high-level syntax element, and determining whether to perform parsing based on the dependent condition.

According to an embodiment of the present document, a dependent condition for efficiently parsing/signaling syntax elements having dependency may be defined with respect to transform skip and/or palette coding related information, and whether to parse the transform skip and/or palette coding related information may be determined based on the dependent condition. Image information may include a sequence parameter set (SPS), and the SPS may include transform skip enabled information and palette coding enabled information. For example, based on a condition that a value of the transform skip enabled information is 1 or a value of the palette coding enabled information is 1, the SPS may further include minimum quantization parameter information related to the minimum allowed quantization parameter for a transform skip mode. Further, for example, based on the condition that the value of the transform skip enabled information is 1, the SPS may further include BDPCM enabled information on whether block-based delta pulse code modulation (BDPCM) is enabled. Further, for example, based on the condition that the value of the transform skip enabled information is 1, the SPS may further include information on the maximum block size used in the transform skip mode.

According to an embodiment of the present document, a video/image decoding method performed by a decoding apparatus is provided. The video/image decoding method may include a method disclosed in embodiments of the present document.

According to an embodiment of the present document, a decoding apparatus performing video/image decoding is provided. The decoding apparatus may perform a method disclosed in embodiments of the present document.

According to an embodiment of the present document, a video/image encoding method performed by an encoding apparatus is provided. The video/image encoding method may include a method disclosed in embodiments of the present document.

According to an embodiment of the present document, an encoding apparatus performing video/image encoding is provided. The encoding apparatus may perform a method disclosed in embodiments of the present document.

According to an embodiment of the present document, a computer-readable digital storage medium storing encoded video/image information generated according to a video/image encoding method disclosed in at least one of embodiments of the present document is provided.

According to an embodiment of the present document, a computer-readable digital storage medium storing encoded information or encoded video/image information causing a decoding apparatus to perform a video/image decoding method disclosed in at least one of embodiments of the present document is provided.

The present document may have various effects. For example, according to an embodiment of the present document, the overall image/video compression efficiency can be enhanced. Further, according to an embodiment of the present document, the transform skip and/or palette coding related information can be efficiently parsed/signaled. Further, according to an embodiment of the present document, whether to perform coding can be effectively determined in accordance with the dependency and/or non-dependency of the information being used during the transform skip and/or palette coding. Further, according to an embodiment of the present document, efficient coding is possible by defining the dependent condition for effectively parsing the syntax element having dependency with respect to the transform skip and/or palette coding related high-level syntax element, and determining whether to perform parsing in accordance with the dependent condition. Further, according to an embodiment of the present document, bits being transmitted can be saved by determining whether to perform parsing in accordance with the dependent condition with respect to the transform skip and/or palette coding related high-level syntax element.

Effects that can be obtained through detailed embodiments in the present document are not limited to the above-mentioned effects. For example, there may be various technical effects that can be understood or induced from the present document by a person having ordinary skill in the related art. Accordingly, the detailed effects of the present document are not limited to those explicitly described in the present document, and may include various effects that can be understood or induced from the technical features of the present document.

DESCRIPTION OF EXEMPLARY EMBODIMENTS

Figure 1:
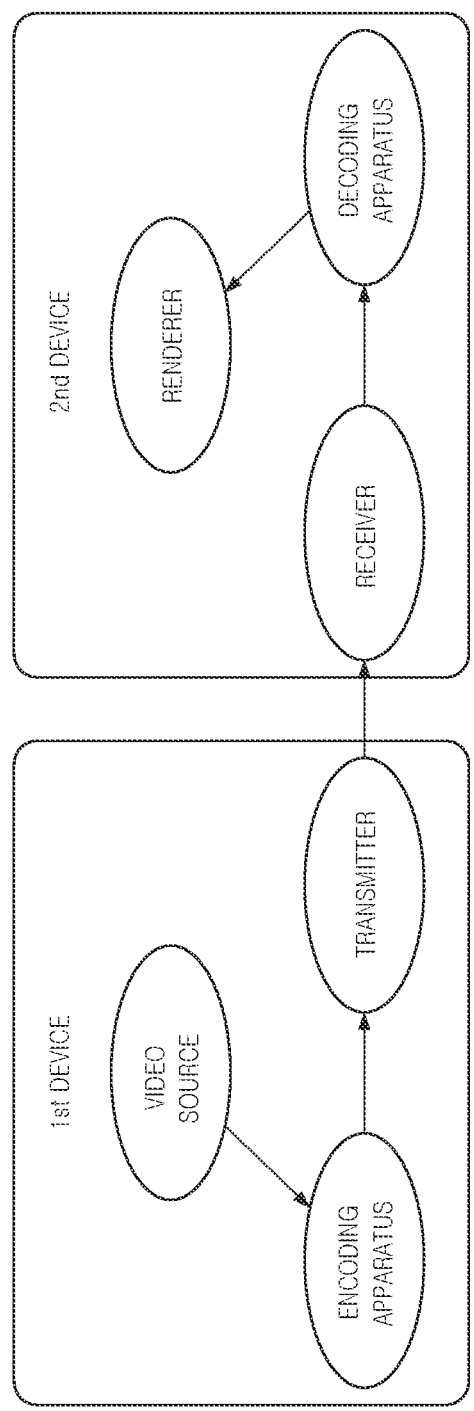
FIG. 1 schematically illustrates an example of a video/image coding system to which embodiments of the present document are applicable.

The present document may be modified in various ways and may have various embodiments, and specific embodiments will be illustrated in the drawings and described in detail. However, this does not intend to limit the present document to the specific embodiments. Terms commonly used in this specification are used to describe a specific embodiment and is not used to limit the technical spirit of the present document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in the present document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of the present document unless it deviates from the essence of the present document.

In the present document, technical features individually explained in one drawing may be individually implemented, or may be simultaneously implemented.

Hereinafter, preferred embodiments of the present document are described more specifically with reference to the accompanying drawings. Hereinafter, in the drawings, the same reference numeral is used in the same element, and a redundant description of the same element may be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In the present document, the term "A or B" may mean "only A", "only B", or "both A and B". In other words, in the present document, the term "A or B" may be interpreted to indicate "A and/or B". For example, in the present document, the term "A, B or C" may mean "only A", "only B", "only C", or "any combination of A, B and C".

A slash "/" or a comma used in the present document may mean "and/or". For example, "A/B" may mean "A and/or B". Accordingly, "A/B" may mean "only A", "only B", or "both A and B". For example, "A, B, C" may mean "A, B or C".

In the present document, "at least one of A and B" may mean "only A", "only B", or "both A and B". Further, in the present document, the expression "at least one of A or B" or "at least one of A and/or B" may be interpreted the same as "at least one of A and B".

Further, in the present document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present document may mean "for example". Specifically, in the case that "prediction (intra prediction)" is expressed, it may be indicated that "intra prediction" is proposed as an example of "prediction". In other words, the term "prediction" in the present document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

The present document relates to video/image coding. For example, the methods/embodiments disclosed in the present document may be applied to a method disclosed in the versatile video coding (VVC) standard. Further, the methods/embodiments disclosed in the present document may be applied to a method disclosed in the essential video coding (EVC) standard, the AOMedia Video 1 (AV1) standard, the 2nd generation of audio video coding standard (AVS2), or the next generation video/image coding standard (ex. H.267 or H.268, etc.).

The present document presents various embodiments of video/image coding, and the embodiments may be performed in combination with each other unless otherwise mentioned.

In the present document, a video may mean a set of a series of images according to the passage of time. A picture generally means a unit representing one image in a specific time period, and a slice/tile is a unit constituting a part of the picture in coding. The slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a width specified by syntax elements in the picture parameter set and a height equal to the height of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within the picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, a sample may mean a pixel value in the spatial domain, or may mean a transform coefficient in the frequency domain when the pixel value is transformed into the frequency domain.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in the present document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In the present document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of the present document as well.

Figure 2:
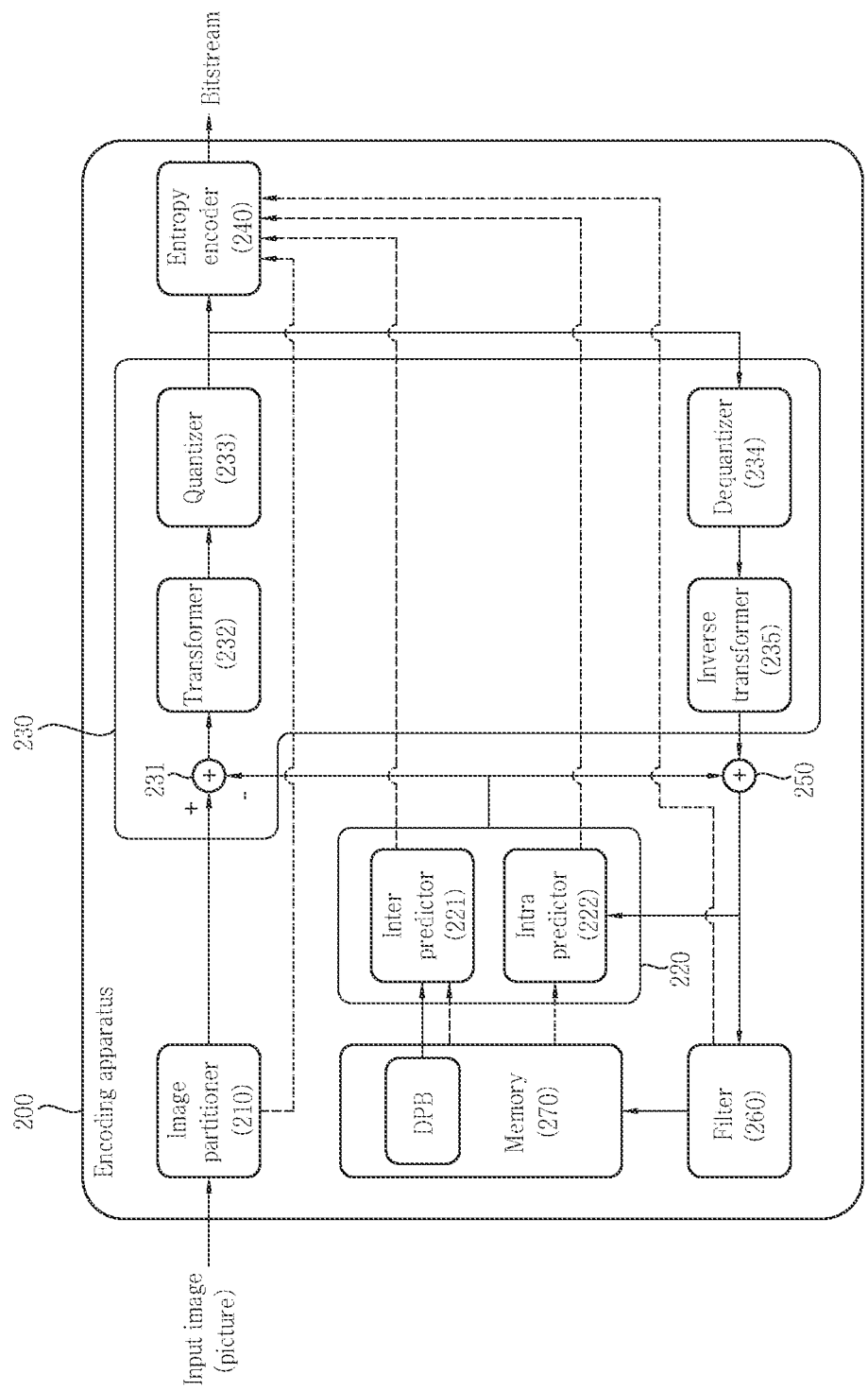
FIG. 2 is a diagram schematically illustrating the configuration of a video/image encoding apparatus to which embodiments of the present document are applicable.

FIG. 2 is a diagram schematically illustrating a configuration of a video/image encoding apparatus to which the embodiments of the present document may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
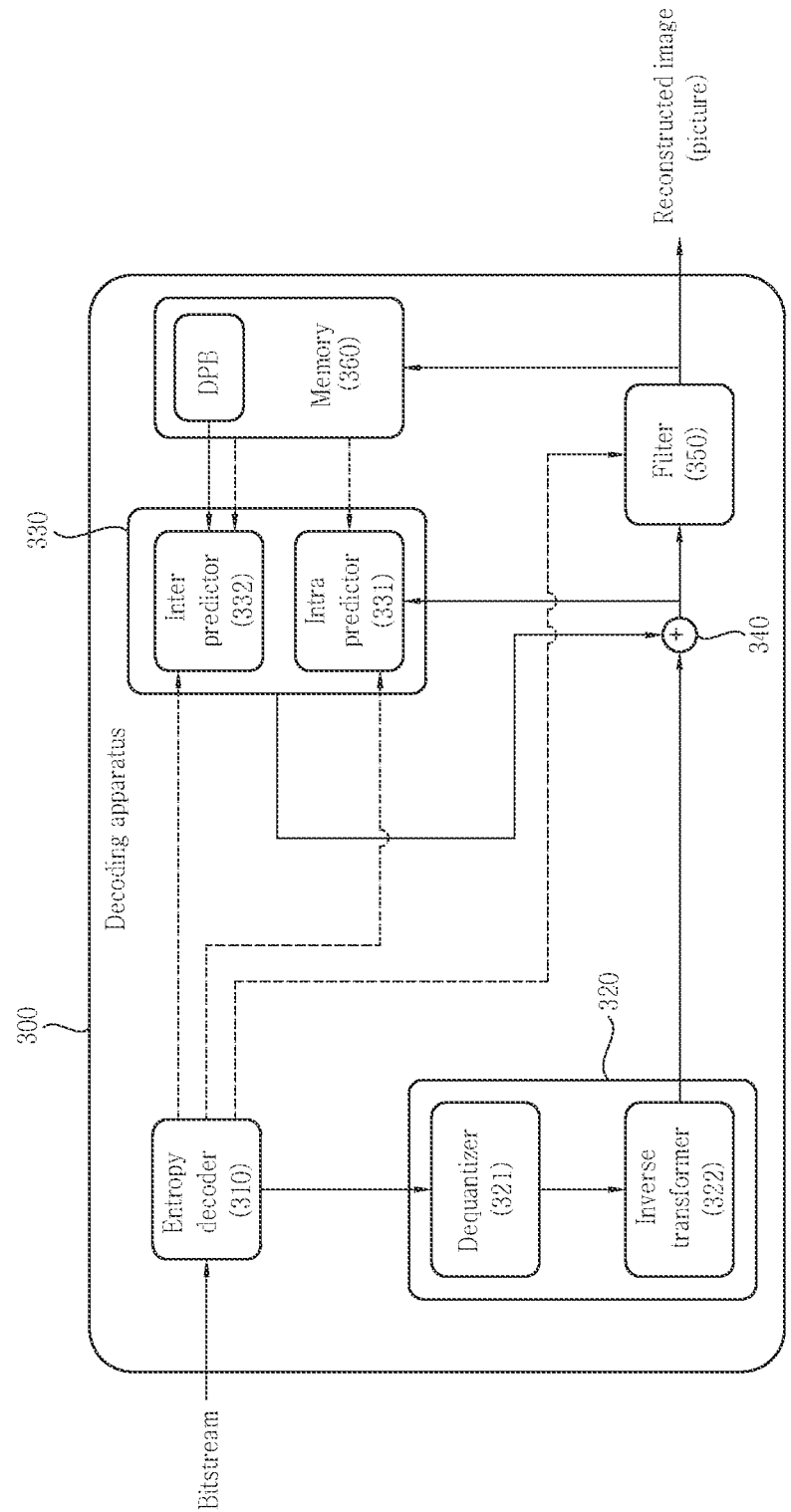
FIG. 3 is a diagram schematically explaining the configuration of a video/image decoding apparatus to which embodiments of the present document are applicable.

FIG. 3 is a diagram for schematically explaining a configuration of a video/image decoding apparatus to which the present document is applicable. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

The following drawing has been prepared to explain a detailed example of the present document. Since the name of a detailed device or a detailed term or name (e.g., name of syntax) described in the drawing is exemplarily presented, the technical features of the present document are not limited to the detailed name used in the drawing.

Figure 4:
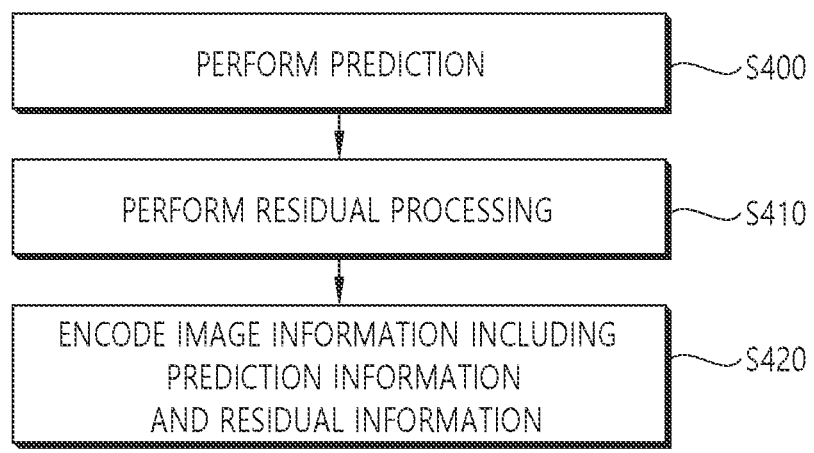
FIG. 4 illustrates an example of a schematic video/image encoding procedure to which embodiment(s) of the present document are applicable.

FIG. 4 illustrates an example of a schematic video/image encoding procedure to which embodiment(s) of the present document are applicable. In FIG. 4, S400 may be performed by the predictor 220 of the encoding apparatus as described above with reference to FIG. 2, S410 may be performed by the residual processor 230, and S420 may be performed by the entropy encoder 240. S400 may include the inter/intra prediction procedure as explained in the present document, S410 may include the residual processing procedure as explained in the present document, and S420 may include the information encoding procedure as explained in the present document.

Referring to FIG. 4, the video/image encoding procedure may include not only a procedure of schematically encoding information for picture reconstruction (e.g., prediction information, residual information, partitioning information, and the like) and outputting the encoded information in the form of a bitstream, but also a procedure of generating a reconstructed picture for the current picture and a procedure (optional) of applying in-loop filtering to the reconstructed picture. The encoding apparatus may derive (modified) residual samples from the quantized transform coefficients through the dequantizer 234 and the inverse transformer 235, and may generate the reconstructed picture based on the prediction samples that are outputs of S400 and the (modified) residual samples. The reconstructed picture generated as above may be equal to the reconstructed picture generated by the above-described decoding apparatus. The modified reconstructed picture may be generated through the in-loop filtering procedure for the reconstructed picture, and may be stored in a decoded picture buffer or the memory 270. In the same manner as the decoding apparatus, during the subsequent picture encoding, the modified reconstructed picture may be used as a reference picture in the inter prediction procedure. As described above, according to circumstances, a part or the whole of the in-loop filtering procedure may be omitted. In case that the in-loop filtering procedure is performed, (in-loop) filtering-related information (parameter) may be encoded and outputted in the form of the bitstream by the entropy encoder 240, and the decoding apparatus may perform the in-loop filtering procedure in the same method as that in the encoding apparatus based on the filtering-related information.

Through such an in-loop filtering procedure, noises occurring during the image/moving image coding, such as blocking artifacts and ringing artifacts can be reduced, and the subjective/objective visual quality can be enhanced. Further, since both the encoding apparatus and the decoding apparatus perform the in-loop filtering procedure, they can derive the same prediction results, enhance reliability of the picture coding, and reduce an amount of data to be transmitted for the picture coding.

As described above, not only the decoding apparatus but also the encoding apparatus may perform the picture reconstruction procedure. The reconstructed block may be generated based on the intra prediction/inter prediction for each block, and the reconstructed picture including the reconstructed blocks may be generated. In case that the current picture/slice/tile group is I picture/slice/tile group, blocks included in the current picture/slice/tile group may be reconstructed based on only the intra prediction. Meanwhile, in case that the current picture/slice/tile group is P or B picture/slice/tile group, the blocks included in the current picture/slice/tile group may be reconstructed based on the intra prediction or the inter prediction. In this case, the inter prediction may be applied to some blocks in the current picture/slice/tile group, and the intra prediction may be applied to the remaining blocks. Color components of the picture may include luma components and chroma components, and unless explicitly limited, methods and embodiments proposed in the present document may be applied to the luma components and the chroma components.

Figure 5:
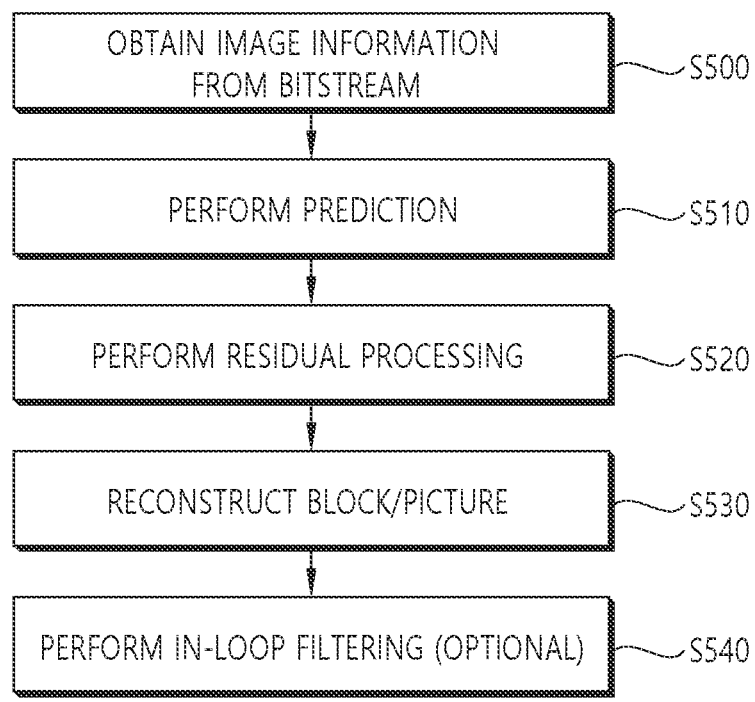
FIG. 5 illustrates an example of a schematic video/image decoding procedure to which embodiment(s) of the present document are applicable.

FIG. 5 illustrates an example of a schematic video/image decoding procedure to which embodiment(s) of the present document are applicable. In FIG. 5, S500 may be performed by the entropy decoder 310 of the decoding apparatus as described above with reference to FIG. 3, S510 may be performed by the predictor 330, S520 may be performed by the residual processor 320, S530 may be performed by the adder 340, and S540 may be performed by the filter 350. S500 may include the information decoding procedure as explained in the present document, S510 may include the inter/intra prediction procedure as explained in the present document, S520 may include the residual processing procedure as explained in the present document, S530 may include the block/picture reconstruction procedure as explained in the present document, and S540 may include the in-loop filtering procedure as explained in the present document.

Referring to FIG. 5, the picture decoding procedure may schematically include the image/video information obtaining procedure (S500) from the bitstream (through decoding), the picture reconstruction procedure (S510 to S530), and the in-loop filtering procedure (S540) for the reconstructed picture as explained above with reference to FIG. 3. The picture reconstruction procedure may be performed based on the prediction samples and the residual samples obtained through processes of the inter/intra prediction (S510) and the residual processing (dequantization and inverse transform of the quantized transform coefficients) (S520). The modified reconstructed picture may be generated through the in-loop filtering procedure for the reconstructed picture generated through the picture reconstruction procedure, the modified reconstructed picture may be outputted as the decoded picture, and may be stored in the decoded picture buffer or the memory 360 of the decoding apparatus to be used as the reference picture in the inter prediction procedure during the following picture decoding.

According to circumstances, the in-loop filtering procedure may be omitted, and in this case, the reconstructed picture may be outputted as the decoded picture, and may also be stored in the decoded picture buffer or the memory 360 of the decoding apparatus to be used as the reference picture in the inter prediction procedure during the following picture decoding. As described above, the in-loop filtering procedure (S540) may include the deblocking filtering procedure, the sample adaptive offset (SAO) procedure, the adaptive loop filter (ALF) procedure, and/or the bi-lateral filter procedure, and some or all of them may be omitted. Further, one or some of the deblocking filtering procedure, the sample adaptive offset (SAO) procedure, the adaptive loop filter (ALF) procedure, and/or the bi-lateral filter procedure may be sequentially applied, or all of the above procedures may be sequentially applied. For example, the SAO procedure may be performed after the deblocking filtering procedure is applied to the reconstructed picture. Further, for example, the ALF procedure may be performed after the deblocking filtering procedure is applied to the reconstructed picture. These may be performed in the same manner even in the encoding apparatus.

Meanwhile, as described above, the encoding apparatus may perform entropy encoding based on various encoding methods, for example, such as exponential Golomb, context-adaptive variable length coding (CAVLC), and context-adaptive binary arithmetic coding (CABAC). Further, the decoding apparatus may perform entropy decoding based on the coding method, such as the exponential Golomb coding, CAVLC, or CABAC. Hereinafter, an entropy encoding/decoding process will be described.

Figure 6:
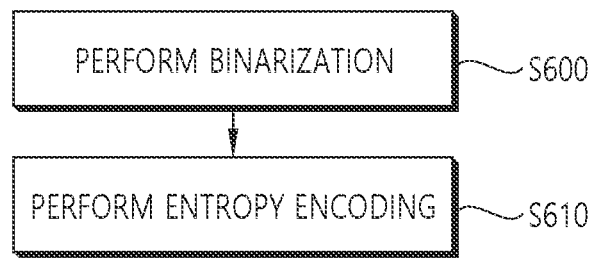
FIG. 6 schematically illustrates an example of an entropy encoding method to which embodiments of the present document are applicable, and FIG. 7 schematically illustrates an entropy encoder in an encoding apparatus.
Figure 7:
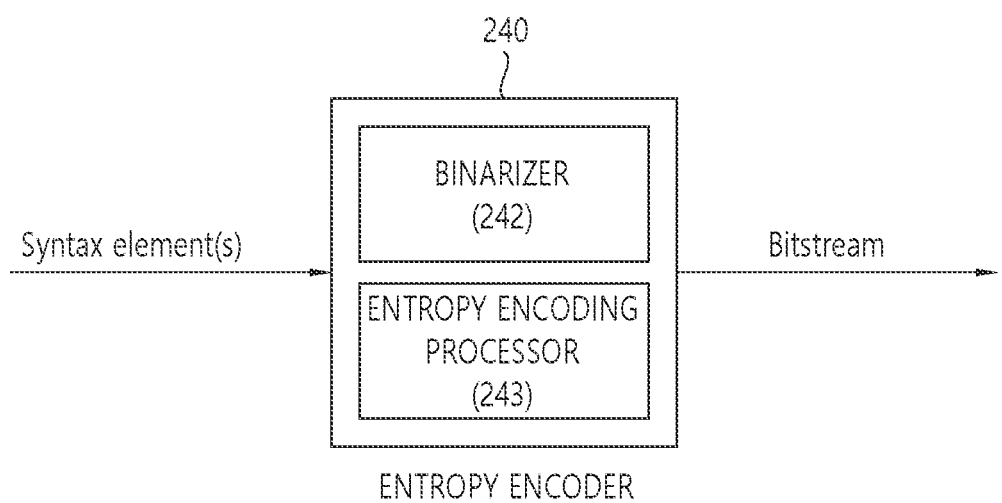

FIG. 6 schematically illustrates an example of an entropy encoding method to which embodiments of the present document are applicable, and FIG. 7 schematically illustrates an entropy encoder in an encoding apparatus. The entropy encoder in the encoding apparatus of FIG. 7 may be applied equally or correspondingly even to the entropy encoder 240 of the encoding apparatus 200 of FIG. 2 as described above.

Referring to FIGS. 6 and 7, the encoding apparatus (entropy encoder) may perform an entropy coding process for image/video information. The image/video information may include partitioning-related information, prediction-related information (e.g., inter/intra prediction classification information, intra prediction mode information, inter prediction mode information, and the like), residual information, and in-loop filtering related information, and may also include various syntax elements thereof. The entropy coding may be performed in the unit of a syntax element. S600 to S610 may be performed by the entropy encoder 240 of the encoding apparatus 200 of FIG. 2 as described above.

The encoding apparatus may perform binarization for a target syntax element (S600). Here, the binarization may be based on various binarization methods, such as truncated rice binarization process and fixed-length binarization process, and the binarization method for the target syntax element may be predefined. The binarization process may be performed by the binarizer 242 in the entropy encoder 240.

The encoding apparatus may perform entropy encoding for the target syntax element (S610). The encoding apparatus may perform normal coding based (context-based) or bypass coding based encoding of a bin string of the target syntax element based on an entropy coding technique, such as context-adaptive arithmetic coding (CABAC) or context-adaptive variable length coding (CAVLC), and its output may be included in the bitstream. The entropy encoding process may be performed by the entropy encoding processor 243 in the entropy encoder 240. The bitstream may be transferred to the decoding apparatus through a (digital) storage medium or a network as described above.

Figure 8:
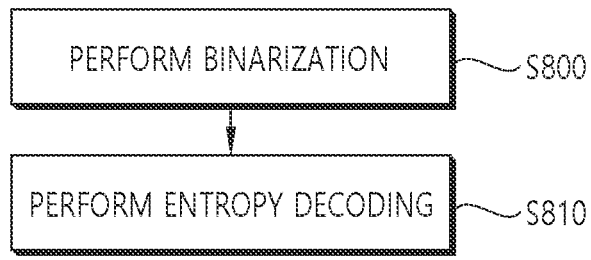
FIG. 8 schematically illustrates an example of an entropy decoding method to which embodiments of the present document are applicable, and FIG. 9 schematically illustrates an entropy decoder in a decoding apparatus.
Figure 9:
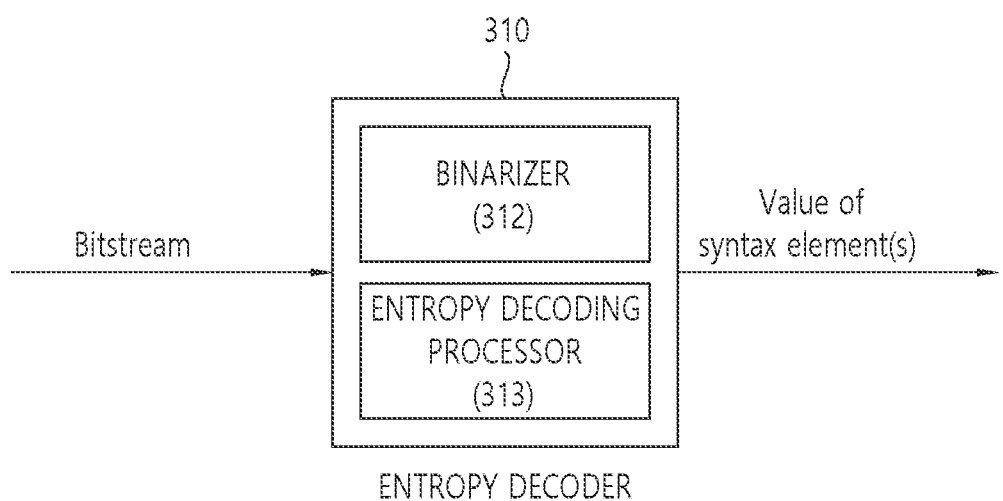

FIG. 8 schematically illustrates an example of an entropy decoding method to which embodiments of the present document are applicable, and FIG. 9 schematically illustrates an entropy decoder in a decoding apparatus. The entropy decoder in the decoding apparatus of FIG. 9 may be applied equally or correspondingly even to the entropy decoder 310 of the decoding apparatus 300 of FIG. 3 as described above.

Referring to FIGS. 8 and 9, the decoding apparatus (entropy decoder) may decode encoded image/video information. The image/video information may include partitioning-related information, prediction-related information (e.g., inter/intra prediction classification information, intra prediction mode information, inter prediction mode information, and the like), residual information, and in-loop filtering related information, and may also include various syntax elements thereof. The entropy coding may be performed in the unit of a syntax element. S800 to S810 may be performed by the entropy decoder 310 of the decoding apparatus 300 of FIG. 3 as described above.

The decoding apparatus may perform binarization for a target syntax element (S800). Here, the binarization may be based on various binarization methods, such as truncated rice binarization process and fixed-length binarization process, and the binarization method for the target syntax element may be predefined. The decoding apparatus may derive enabled bin strings (bin string candidates) for enabled values of the target syntax element through the binarization process. The binarization process may be performed by the binarizer 312 in the entropy decoder 310.

The decoding apparatus may perform entropy decoding for the target syntax element (S810). The decoding apparatus compares the derived bin string with enabled bin strings for the corresponding syntax element while sequentially decoding and parsing respective bins for the target syntax element from input bit(s) in the bitstream. If the derived bin string is equal to one of the enabled bin strings, a value corresponding to the corresponding bin string may be derived as a value of the corresponding syntax element. If not, the above-described process may be performed again after further parsing the next bit in the bitstream. Through such a process, the corresponding information may be signaled using a variable length bit even without using a start bit or an end bit for specific information (specific syntax element) in the bitstream. Through this, a relatively smaller number of bits may be allocated with respect to a low value, and thus the overall coding efficiency can be enhanced.

The decoding apparatus may perform context-based or bypass-based decoding of the respective bins in the bin string from the bitstream based on the entropy coding technique, such as CABAC or CAVLC. Here, the bitstream may include various kinds of information for image/video decoding as described above. The bitstream may be transferred to the decoding apparatus through a (digital) storage medium or a network as described above.

Figure 10:
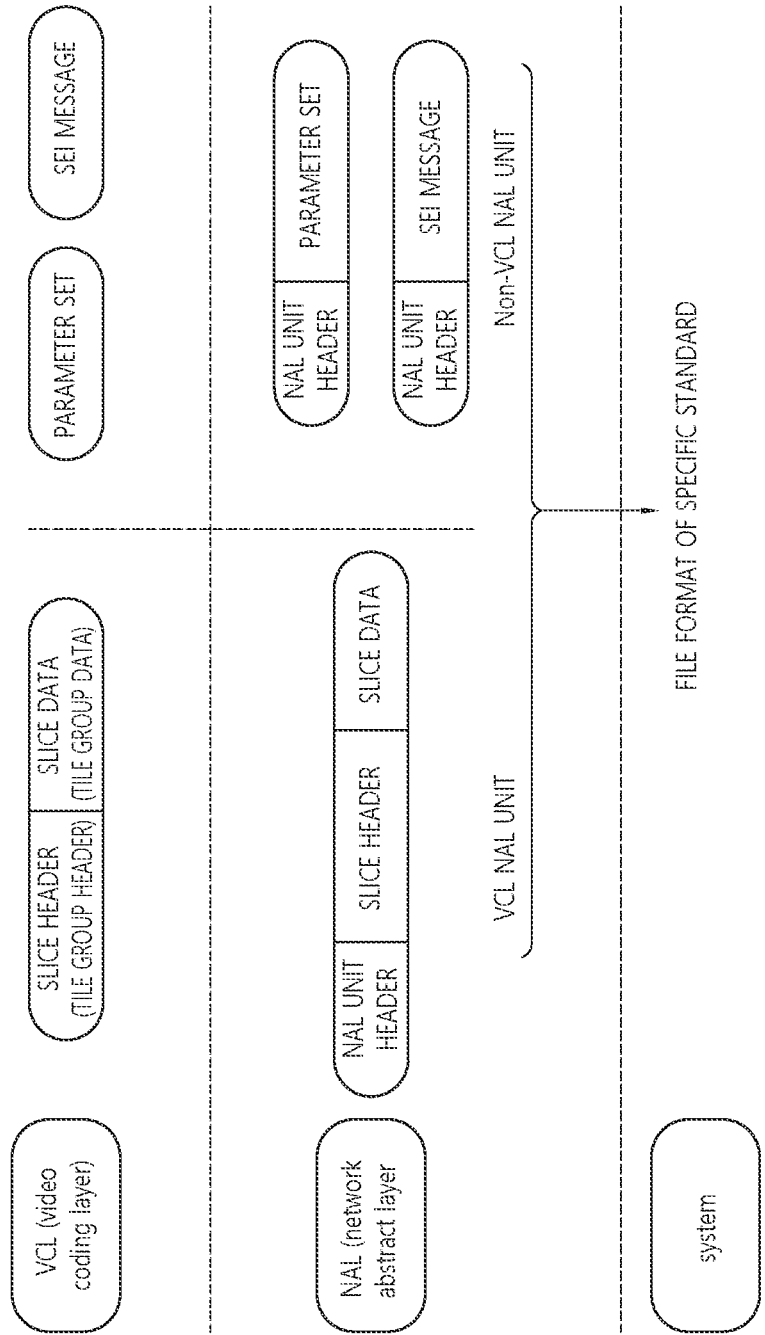
FIG. 10 exemplarily illustrates a hierarchical structure for a coded image/video.

FIG. 10 exemplarily illustrates a hierarchical structure for a coded image/video.

Referring to FIG. 10, a coded image/video is divided into a video coding layer (VCL) that handles the decoding process of the image/video and itself, a subsystem that transmits and stores the coded information, and a network abstraction layer (NAL) present between the VCL and the subsystem and in charge of network adaptation function.

In the VCL, VCL data including compressed image data (slice data) may be generated, or a parameter set including a picture parameter set (PPS), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in the VCL. In this case, the RBSP refers to slice data, parameter set, SEI message, and the like, generated in the VCL. The NAL unit header may include NAL unit type information specified according to RBSP data included in the corresponding NAL unit.

Further, the NAL unit may be classified into a VCL NAL unit and a Non-VCL NAL unit according to the RBSP generated in the VCL. The VCL NAL unit may mean a NAL unit that includes information on the image (slice data), and the Non-VCL NAL unit may mean a NAL unit that includes information (parameter set or SEI message) required for decoding the image.

The VCL NAL unit and the Non-VCL NAL unit may be transmitted through a network through attachment of header information thereto according to the data standard of the subsystem. For example, the NAL unit may be transformed into a data format of a predetermined standard, such as an H.266/VVC file format, a real-time transport protocol (RTP), a transport stream (TS), and the like, and may be transmitted through various networks.

As described above, the NAL unit may be specified with the NAL unit type according to the RBSP data structure included in the corresponding NAL unit, and information on the NAL unit type may be stored in the NAL unit header to be signaled.

For example, the NAL unit may be briefly classified into a VCL NAL unit type and a Non-VCL NAL unit type depending on whether the NAL unit includes information (slice data) about an image. The VCL NAL unit type may be classified according to the nature and type of pictures included in the VCL NAL unit, and the Non-VCL NAL unit type may be classified according to the type of the parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS(Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types may have syntax information for the NAL unit type, and the syntax information may be stored in a NAL unit header to be signaled. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In the present document, a tile group may be mixed with or replaced by a slice or a picture. Also, in the present document, a tile group header may be mixed with or replaced by a slice header or a picture header.

The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high-level syntax (HLS) in the present document may include at least one of the APS syntax, the PPS syntax, the SPS syntax, the VPS syntax, the DPS syntax, picture header syntax, and the slice header syntax.

In the present document, the image/video information encoded from the encoding apparatus and signaled to the decoding apparatus in the form of a bitstream may include not only partitioning related information in a picture, intra/inter prediction information, residual information, in-loop filtering information, and the like, but also information included in a slice header, information included in a picture header, information included in an APS, information included in a PPS, information included in an SPS, information included in a VPS, and/or information included in a DPS. Further, the image/video information may further include information of a NAL unit header.

In the present document, in order to represent signaling of information from the encoding apparatus to the decoding apparatus, a table (syntax table) including syntax elements may be used. The order of syntax elements in the syntax table used in the present document may represent a parsing order of syntax elements from the bitstream. The encoding apparatus may configure and encode the syntax table so that the syntax elements can be parsed by the decoding apparatus in the parsing order, and the decoding apparatus may obtain values of the syntax elements by parsing and decoding the syntax elements in the corresponding syntax table in the parsing order from the bitstream.

Meanwhile, as described above, the residual samples may be derived as quantized transform coefficients through the transform and quantization processes. The quantized transform coefficients may be called transform coefficients. In this case, the transform coefficients in the block may be signaled in the form of residual information. The residual information may include a residual coding syntax. That is, the encoding apparatus may configure the residual coding syntax with the residual information, and may encode the configured residual coding syntax to output the encoded residual coding syntax in the form of a bitstream. The decoding apparatus may derive residual (quantized) transform coefficients by decoding the residual coding syntax from the bitstream. As described below, the residual coding syntax may include syntax elements representing whether the transform has been applied to the corresponding block, where is the position of the last effective transform coefficient in the block, whether an effective transform coefficient is present in a subblock, and what is the size/sign of the effective transform coefficient.

For example, the (quantized) transform coefficients may be encoded and/or decoded based on the syntax elements, such as last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gtX_flag, abs_remainder, coeff_sign_flag, dec_abs_level included in the residual information. This may be called residual (data) coding or (transform) coefficient coding. In this case, the transform/quantization process may be omitted. In this case, values of the residual samples may be coded and signaled in accordance with a determined method. The syntax elements related to the residual data encoding/decoding may be represented as in Table 1 below.

TABLE 1

| | Descriptor |
|---|---|
| ```
residual_coding( x0, y0, log2TbWidth, log2TbHeight, cIdx ) {
  if( ( tu_mts_idx[ x0 ][ y0 ] > 0 ||
      ( cu_sbt_flag && log2TbWidth < 6 && log2TbHeight < 6 ) )
      && cIdx = = 0 && log2TbWidth > 4 )
    log2ZoTbWidth = 4
  else
    log2ZoTbWidth = Min( log2TbWidth, 5 )
  MaxCcbs = 2 * ( 1 << log2TbWidth ) * ( 1<< log2TbHeight )
  if( tu_mts_idx[ x0 ][ y0 ] > 0 ||
      ( cu_sbt_flag && log2TbWidth < 6 && log2TbHeight < 6 ) )
      && cIdx = = 0 && log2TbHeight > 4 )
    log2ZoTbHeight = 4
  else
    log2ZoTbHeight = Min( log2TbHeight, 5 )
  if( log2TbWidth > 0 )
    last_sig_coeff_x_prefix
  if( log2TbHeight > 0 )
    last_sig_coeff_y_prefix
  if( last_sig_coeff_x_prefix > 3 )
    last_sig_coeff_x_suffix
  if( last_sig_coeff_y_prefix > 3 )
    last_sig_coeff_y_suffix
  log2TbWidth = log2ZoTbWidth
  log2TbHeight = log2ZoTbHeight
  remBinsPass1 = ( ( 1 << ( log2TbWidth + log2TbHeight ) ) * 7 ) >> 2
  log2SbW = ( Min( log2TbWidth, log2TbHeight ) < 2 ? 1 : 2 )
  log2SbH = log2SbW
  if( log2TbWidth + log2TbHeight > 3 ) {
    if( log2TbWidth < 2 ) {
      log2SbW = log2TbWidth
      log2SbH = 4 − log2SbW
    } else if( log2TbHeight < 2 ) {
      log2SbH = log2TbHeight
      log2SbW = 4 − log2SbH
    }
  }
  numSbCoeff = 1 << ( log2SbW + log2SbH )
  lastScanPos = numSbCoeff
  lastSubBlock =
    ( 1 << ( log2TbWidth + log2TbHeight − ( log2SbW + log2SbH ) ) ) − 1
  do {
    if( lastScanPos = = 0 ) {
      lastScanPos = numSbCoeff
      lastSubBlock− −
    }
    lastScanPos− −
    xS = DiagScanOrder[ log2TbWidth − log2SbW ][ log2TbHeight − log2SbH ]
              [ lastSubBlock ][ 0 ]
    yS = DiagScanOrder[ log2TbWidth − log2SbW ][ log2TbHeight − log2SbH ]
              [ lastSubBlock ][ 1 ]
    xC = ( xS << log2SbW ) + DiagScanOrder[ log2SbW ][ log2SbH ]
              [ lastScanPos ][ 0 ]
    yC = ( yS << log2SbH ) + DiagScanOrder[ log2SbW ][ log2SbH ]
              [ lastScanPos ][ 1 ]
  } while( ( xC != LastSignificantCoeffX ) || ( yC != LastSignificantCoeffY ) )
  if( lastSubBlock = = 0 && log2TbWidth >= 2 && log2TbHeight
      >= 2 && !transform_skip_flag[ x0 ][ y0 ] && lastScanPos > 0 )
    LfnstDcOnly = 0
  if( ( lastSubBlock > 0 && log2TbWidth >= 2 && log2Weight >= 2 ) ||
      ( lastScanPos > 7 && ( log2TbWidth = = 2 || log2TbWidth = = 3 ) &&
      log2TbWidth = = log2TbHeight ) )
    LfnstZeroOutSigCoeffFlag = 0
  QState = 0
  for( i = lastSubBlock; i >= 0; i− − ) {
    startQStateSb = QState
    xS = DiagScanOrder[ log2TbWidth − log2SbW ][ log2TbHeight − log2SbH ]
              [ i ][ 0 ]
    yS = DiagScanOrder[ log2TbWidth − log2SbW ][ log2TbHeight − log2SbH ]
              [ i ][ 1 ]
    inferSbDcSigCoeffFlag = 0
    if( ( i < lastSubBlock ) && ( i > 0 ) ) {
      coded_sub_block_flag[ xS ][ yS ]
      inferSbDcSigCoeffFlag = 1
    }
    firstSigScanPosSb = numSbCoeff
    lastSigScanPosSb = −1
    firstPosMode0 = ( i = = lastSubBlock ? lastScanPos : numSbCoeff − 1 )
    firstPosMode1 = −1
``` | <br><br><br><br><br><br><br><br><br><br><br>ae(v)<br><br>ae(v)<br><br>ae(v)<br><br>ae(v)<br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br><br>ae(v) |

TABLE 1-continued

|  | Descriptor |
|---|---|
| ```
for( n = firstPosMode0; n >= 0 && remBinsPass1 >= 4; n- - ) {
    xC = ( xS << log2SbW ) + DiagScanOrder[ log2SbW ][ log2SbH ][ n ][ 0 ]
    yC = ( yS << log2SbH ) + DiagScanOrder[ log2SbW ][ log2SbH ][ n ][ 1 ]
    if( coded_sub_block_flag[ xS ][ yS ] &&
        ( n > 0 || !inferSbDcSigCoeffFlag ) &&
        ( xC != LastSignificantCoeffX || yC != Last SignificantCoeffY ) ) {
        sig_coeff_flag[ xC ][ yC ]
        remBinsPass1- -
        if( sig_coeff_flag[ xC ][ yC ] )
            inferSbDcSigCoeffFlag = 0
    }
    if( sig_coeff_flag[ xC ][ yC ] ) {
        abs_level_gtx_flag[ n ][ 0 ]
        remBinsPass1- -
        if( abs_level_gtx_flag[ n ][ 0 ] ) {
            par_level_flag[ n ]
            remBinsPass1- -
            abs_level_gtx_flag[ n ][ 1 ]
            remBinsPass1- -
        }
        if( lastSigScanPosSb = = -1 )
            lastSigScanPosSb = n
        firstSigScanPosSb = n
    }
    AbsLevelPass1[ xC ][ yC ] = sig_coeff_flag[ xC ][ yC ] + par_level_flag[ n ] +
                abs_level_gtx_flag[ n ][ 0 ] + 2 * abs_level_gtx_flag[ n ][ 1 ]
    if( dep_quant_enabled_flag )
        QState = QStateTransTable[ QState ][ AbsLevelPass1[ xC ][ yC ] & 1 ]
    if( remBinsPass1 < 4 )
        firstPosMode1 = n - 1
}
for( n = numSbCoeff - 1; n >= firstPosMode1; n- - ) {
    xC = ( xS << log2SbW ) + DiagScanOrder[ log2SbW ][ log2SbH ][ n ][ 0 ]
    yC = ( yS << log2SbH ) + DiagScanOrder[ log2SbW ][ log2SbH ][ n ][ 1 ]
    if( abs_level_gtx_flag[ n ][ 1 ] )
        abs_remainder[ n ]
    AbsLevel[ xC ][ yC ] = AbsLevelPass1[ xC ][ yC ] +2 * abs_remainder[ n ]
}
for( n = firstPosMode1; n >= 0; n- - ) {
    xC = ( xS << log2SbW ) + DiagScanOrder[ log2SbW ][ log2SbH ][ n ][ 0 ]
    yC = ( yS << log2SbH ) + DiagScanOrder[ log2SbW ][ log2SbH ][ n ][ 1 ]
    dec_abs_level[ n ]
    if(AbsLevel[ xC ][ yC ] > 0 )
        firstSigScanPosSb = n
    if( dep_quant_enabled_flag )
        QState = QStateTransTable[ QState ][ AbsLevel[ xC ][ yC ] & 1 ]
}
if( dep_quant_enabled_flag || !sign_data_hiding_enabled_flag )
    signHidden = 0
else
    signHidden = ( lastSigScanPosSb - firstSigScanPosSb > 3 ? 1 : 0 )
for( n = numSbCoeff - 1; n >= 0; n- - ) {
    xC = ( xS << log2SbW ) + DiagScanOrder[ log2SbW ][ log2SbH ][ n ][ 0 ]
    yC = ( yS << log2SbH ) + DiagScanOrder[ log2SbW ][ log2SbH ][ n ][ 1 ]
    if( ( AbsLevel[ xC ][ yC ] > 0 ) &&
        ( !signHidden || ( n != firstSigScanPosSb ) ) )
        coeff_sign_flag[ n ]
}
if( dep_quant_enabled_flag ) {
    QState = startQStateSb
    for( n = numSbCoeff - 1; n >= 0; n- - ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( AbsLevel[ xC ][ yC ] > 0 )
            TransCoeffLevel[ x0 ][ y0 ][ cIdx ][ xC ][ yC ] =
                ( 2 * AbsLevel[ xC ][ yC ] - ( QState > 1 ? 1 : 0 ) ) *
                ( 1 - 2 * coeff_sign_flag[ n ] )
        QState = QStateTransTable[ QState ][ par_level_flag[ n ] ]
} else {
    sumAbsLevel = 0
    for( n = numSbCoeff - 1; n >= 0; n- - ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( AbsLevel[ xC ][ yC ] > 0 ) {
            TransCoeffLevel[ x0 ][ y0 ][ cIdx ][ xC ][ yC ] =
                AbsLevel[ xC ][ yC ] * ( 1 - 2 * coeff_sign_flag[ n ] )
            if( signHidden ) {
                sumAbsLevel += AbsLevel[ xC ][ yC ]
``` | ae(v)<br><br><br><br><br><br><br><br>ae(v)<br><br><br>ae(v)<br><br>ae(v)<br><br><br><br><br><br><br><br><br><br><br><br><br><br>ae(v)<br><br><br><br><br><br>ae(v)<br><br><br><br><br><br><br><br><br><br><br><br><br>ae(v) |

TABLE 1-continued

Descriptor

```
            if( ( n = = firstSigScanPosSb ) && ( sumAbsLevel % 2 ) = = 1 ) )
               TransCoeffLevel[ x0 ][ y0 ][ cIdx ][ xC ][ yC ] =
                  −TransCoeffLevel[ x0 ][ y0 ][ cIdx ][ xC ][ yC ]
            }
          }
        }
      }
    }
  }
}
```

Referring to Table 1, last_sig_coeff_x_prefix, last_sig_coeff_y_prefix, last_sig_coeff_x_suffix, and last_sig_coeff_y_suffix are syntax elements for encoding (x, y) position information of the last coefficient that is not 0 in an associated block. The associated block may be a coding block (CB) or a transform block (TB). In relation to the transform (and quantization) and residual coding process, the CB and the TB may be used interchangeably. For example, residual samples may be derived for the CB, and the (quantized) transform coefficients may be derived through the transform and quantization with respect to the residual samples as described above, and information (or syntax elements) efficiently representing (the position, size, and sign of) the (quantized) transform coefficients may be generated and signaled through the residual coding process. The quantized transform coefficients may be simply called transform coefficients. In general, if the CB is not larger than the maximum TB, the size of the CB may be equal to the size of the TB, and in this case, the target block that is transformed (and quantized) and residual-coded may be called the CB or TB. Further, if the CB is larger than the maximum TB, the target block that is transformed (and quantized) and residual-coded may be called the TB. Hereinafter, although it is explained that the syntax elements related to the residual coding are signaled in the unit of a transform block (TB), this is exemplary, and the TB may be interchangeably used with the coding block (CB) as described above.

Meanwhile, different residual coding methods may be applied depending on whether a transform skip is applied for the residual coding. As an embodiment, whether the transform skip is applied may be represented using the transform skip flag syntax element, and the residual coding may be branched in accordance with the value of the syntax element transform_skip_flag of the transform skip flag. That is, different syntax elements may be used for the residual coding based on the value of the transform skip flag (based on whether the transform skip is applied). The residual coding being used in case that the transform skip is not applied (i.e., in case that the transform is applied) may be called regular residual coding (RRC), and the residual coding in case that the transform skip is applied (i.e., in case that the transform is not applied) may be called transform skip residual coding (TSRC).

Table 2 below represents a process in which the residual coding is branched based on the syntax element of the transform skip flag.

TABLE 2

| | Descriptor |
|---|---|
| transform unit( x0, y0, tbWidth, tbHeight, treeType, subTuIndex, chType ) { | |
|     transform_skip_flag[ x0 ][ y0 ][ 0 ] | ae(v) |
|     if( !transform skip flag[ x0 ][ y0 ][ 0 ] \|\| slice ts residual coding disabled flag ) | |
|       residual coding( x0, y0, Log2( tbWidth ), Log2( tbHeight ), 0 ) | |
|     else | |
|       residual ts coding( x0, y0, Log2( tbWidth ), Log2( tbHeight ), 0 ) | |
| } | |
| if( tu cbf cb[ xC ][ yC ] && treeType != DUAL TREE LUMA ) { | |
|     if( sps_transform_skip_enabled_flag && !BdpcmFlag[ x0 ][ y0 ][ 1 ] && | |
|       wC <= MaxTsSize && hC <= MaxTsSize && !cu sbt flag ) | |
|     transform_skip_flag[ xC ][ yC ][ 1 ] | ae(v) |
|     if( !transform skip flag[ xC ][ yC ][ 1 ] \|\| slice ts residual coding disabled flag ) | |
|       residual coding( xC, yC, Log2( wC ), Log2( hC ), 1 ) | |
|     else | |
|       residual ts coding( xC, yC, Log2( wC ), Log2( hC ), 1 ) | |
| } | |
| if( tu_cbf_cr[ xC ][ yC ] && treeType != DUAL_TREE_LUMA && | |
|     !( tu_cbf_cb[ xC ][ yC ] && tu_joint_cbcr_residual_flag[ xC ][ yC ] ) ) { | |
|     if( sps_transform_skip_enabled_flag && !BdpcmFlag[ x0 ][ y0 ][ 2 ] && | |
|       wC <= MaxTsSize && hC <= MaxTsSize && !cu_sbt_flag ) | |
|     transform skip flag[ xC ][ yC ][ 2 ] | ae(v) |
|     if( !transform skip flag[ xC ][ yC ][ 2 ] \|\| [ slice ts residual coding disabled flag ) | |
|       residual coding( xC, yC, Log2( wC ), Log2( hC ), 2 ) | |
|     else | |
|       residual ts coding( xC, yC, Log2( wC ), Log2( hC ), 2 ) | |
| } | |
| } | |

Referring to Table 2 above, in case that the transform skip is not applied (e.g., in case that the value of the transform_skip_flag is 0), the regular residual coding is performed, and this may be performed based on the syntax elements disclosed in Table 1 described above. Further, in case that the transform skip is applied (e.g., in case that the value of the transform_skip_flag is 1), the transform skip residual coding is performed, and this may be performed based on the syntax elements disclosed in Table 3 below.

Table 3 below represents the syntax elements for the transform skip residual coding.

TABLE 3

| | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 << log2TbWidth ) * ( 1 << log2TbHeight ) | |
|   for( i =0; i <= lastSubBlock; i++ ) { | |
|     xS = DiagScanOrder[log2TbWidth−log2SbSize][log2TbHeight−log2SbSize][i][0] | |
|     yS = DiagScanOrder[log2TbWidth−log2SbSize][log2TbHeight−log2SbSize][i][1] | |
|     if( ( i != lastSubBlock \|\| !inferSbCbf ) { | |
|       coded_sub_block_flag[ xS ][ yS ] | ae(v) |
|     } | |
|     if( coded_sub_block_flag[ xS ][ yS ] && i < lastSubBlock ) | |
|       inferSbCbf = 0 | |
|     /* First scan pass */ | |
|     inferSbSigCoeffFlag = 1 | |
|     for( n = 0; n <= numSbCoeff − 1; n++ ) { | |
|       xC = (xS << log2SbSize ) + DiagScanOrder[ log2SbSize ][ log2SbSize ][ n ][ 0 ] | |
|       yC = (yS << log2SbSize ) + DiagScanOrder[ log2SbSize ][ log2SbSize ][ n ][ 1 ] | |
|       if( coded_sub_block_flag[ xS ][ yS ] && | |
|         ( n != numSbCoeff − 1 \|\| !inferSbSigCoeffFlag ) ) { | |
|         sig_coeff_flag[ xC ][ yC ] | ae(v) |
|         MaxCcbs− − | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         MaxCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         MaxCcbs− − | |
|         if( abs_level_gtx_flag[ n ][ 0 ] ) { | |
|           par_level_flag[ n ] | ae(v) |
|           MaxCcbs− − | |
|         } | |
|       } | |
|       AbsLevelPassX[ xC ][ yC ] = sig_coeff_flag[ xC ][ yC ] + par_level_flag[ n ] + | |
|         abs_level_gtx_flag[ n ][ 0 ] | |
|     } | |
|     /* Greater than X scan pass (numGtXFlags=5) */ | |
|     for( n = 0; n <= numSbCoeff − 1; n++ ) { | |
|       xC = (xS << log2SbSize) + DiagScanOrder[ log2SbSize ][ log2SbSize ][ n ][ 0 ] | |
|       yC = (yS << log2SbSize) + DiagScanOrder[ log2SbSize ][ log2SbSize ][ n ][ 1 ] | |
|       for( j = 1; j < 5; j++ ) { | |
|         if( abs_level_gtx_flag[ n ][ j − 1 ] ) | |
|           abs_level_gtx_flag[ n ][ j ] | ae(v) |
|         MaxCcbs− − | |
|         AbsLevelPassX[ xC ][ yC ] + = 2 * abs_level_gtx_flag[ n ][ j ] | |
|       } | |
|     } | |
|     /* remainder scan pass */ | |
|     for( n = 0; n <= numSbCoeff − 1; n++ ) { | |
|       xC = (xS << log2SbSize ) + DiagScanOrder[ log2SbSize ][ log2SbSize ][ n][ 0 ] | |
|       yC = (yS << log2SbSize ) + DiagScanOrder[ log2SbSize ][ log2SbSize ][ n][ 1 ] | |
|       if( abs_level_gtx_flag[ n ][ 4 ] ) | |
|         abs_remainder[ n ] | ae(v) |
|       if( intra_bdpcm_flag = = 0 ) { | |
|         absRightCoeff = abs( TransCoeffLevel[ x0 ][ y0 ][ cIdx ][ xC − 1 ][ yC ] ) | |
|         absBelowCoeff = abs( TransCoeffLevel[ x0 ][ y0 ][ cIdx ][ xC ][ yC − 1 ] ) | |
|         predCoeff = Max( absRightCoeff, absBelowCoeff ) | |
|         if( AbsLevelPassX[ xC ][ yC ] + abs_remainder[ n ] = = 1 && predCoeff > 0 ) | |
|           TransCoeffLevel[ x0 ][ y0 ][ cIdx ][ xC ][ yC ] = | |
|             (1 − 2 * coeff_sign_flag[ n ] ) * predCoeff | |
|         else if( AbsLevelPassX[ xC ][ yC ] + abs_remainder[ n ] <= predCoeff ) | |
|           TransCoeffLevel[ x0 ][ y0 ][ cIdx ][ xC ][ yC ] = ( 1 − 2 * coeff_sign_flag[ n ] ) * | |
|             ( AbsLevelPassX[ xC ][ yC ] + abs_remainder[ n ] − 1 ) | |

TABLE 3-continued

Descriptor

```
        else
            TransCoeffLevel[ x0 ][ y0 ][ cIdx ][ xC ][ yC ] = ( 1 − 2 *
coeff_sign_flag[ n ] ) *
                ( AbsLevelPassX[ xC ][ yC ] + abs_remainder[ n ] )
        } else
            TransCoeffLevel[ x0 ][ y0 ][ cIdx ][ xC ][ yC ] = ( 1 − 2 *
coeff_sign_flag[ n ] ) *
                ( AbsLevelPassX[ xC ][ yC ] + abs_remainder[ n ] )
        }
    }
}
```

For example, the transform skip flag indicating whether the transform skip of the transform block is performed may be parsed, and it may be determined whether the transform skip flag is 1. In case that the value of the transform skip flag is 1, as shown in Table 3, syntax elements sig_coeff_flag, coeff_sign_flag, abs_level_gtx_flag, par_level_flag, and/or abs_remainder for the residual coefficient of the transform block may be parsed, and the residual coefficient may be derived based on the syntax elements. In this case, the syntax elements may be sequentially parsed, and the parsing order may be changed. Here, the abs_level_gtx_flag may represent abs_level_gt1_flag, abs_level_gt3_flag, abs_level_gt5_flag, abs_level_gt7_flag, and/or abs_level_gt9_flag. For example, the abs_level_gtx_flag[n][j] may be a flag representing whether an absolute value of the transform coefficient level (or value obtained by shifting the transform coefficient level by 1 to the right) is larger than (j<<1)+1 at a scanning position n. The (j<<1)+1 may be replaced by a specific threshold value, such as a first threshold value or a second threshold value in some cases.

Further, in case that the value of the transform skip flag is 0, as shown in Table 1, syntax elements sig_coeff_flag, abs_level_gtx_flag, par_level_flag, abs_remainder, dec_abs_level, and coeff_sign_flag for the residual coefficient of the transform block may be parsed, and the residual coefficient may be derived based on the syntax elements. In this case, the syntax elements may be sequentially parsed, and the parsing order may be changed. Here, the abs_level_gtx_flag may represent abs_level_gt1_flag and/or abs_level_gt3_flag.

Meanwhile, as described above, the encoding apparatus may derive a residual block (residual samples) based on a predicted block (prediction samples) through intra/inter/IBC/palette predictions, and may derive quantized transform coefficients by applying transform and quantization with respect to the derived residual samples. The information (residual information) on the quantized transform coefficients may be included in the residual coding syntax, and may be output in the form of a bitstream after being encoded. The decoding apparatus may obtain information (residual information) on the quantized transform coefficients from the bitstream, and may derive the quantized transform coefficients by decoding the obtained information. The decoding apparatus may derive the residual samples through dequantization/inverse transform based on the quantized transform coefficients. As described above, at least one of the quantization/dequantization and/or transform/inverse transform may be omitted. In case that the transform/inverse transform is omitted, the transform coefficient may be called a coefficient or residual coefficient, or for unity of expression, may still be called the transform coefficient. Whether to omit the transform/inverse transform may be signaled based on the transform_skip_flag. For example, if the value of the transform_skip_flag is 1, it may represent that the transform/inverse transform is omitted, and this may be referred to as a transform skip mode.

In general, in the video/image coding, the quantization rate may be changed, and the compression rate may be adjusted using the changed quantization rate. From the viewpoint of implementation, a quantization parameter (QP) may be used instead of direct usage of the quantization rate in consideration of complexity. For example, a quantization parameter of an integer value in the range of 0 to 63 may be used, and each value of the quantization parameter may correspond to the actual quantization rate. Further, for example, a quantization parameter $QP_y$ for a luma component (luma sample) and a quantization parameter QPc for a chroma component (chroma sample) may be differently configured.

In a quantization process, the quantized transform coefficient C' may be obtained by dividing an input transform coefficient C by the quantization rate $Q_{step}$. In this case, in consideration of computational complexity, the quantization rate is made in an integer form by multiplying the quantization rate by a scale, and a shift operation may be performed as much as the value corresponding to the scale value. A quantization scale may be derived based on a product of the quantization rate and the scale value. That is, the quantization scale may be derived according to the QP. For example, the quantization scale may be applied to the transform coefficient C, and based on this, the quantized transform coefficient C' may be derived.

The dequantization process is reverse to the quantization process, and the quantized transform coefficient C' may be multiplied by the quantization rate $Q_{step}$, and based on this, a reconstructed transform coefficient C" may be obtained. In this case, a level scale may be derived according to the quantization parameter, the level scale may be applied to the quantize3d transform coefficient C', and based on this, the reconstructed transform coefficient C" may be derived. The reconstructed transform coefficient C" is somewhat different from the initial transform coefficient C due to a loss in the transform and/or quantization process. Accordingly, even the encoding apparatus performs dequantization in the same manner as in the decoding apparatus.

Further, in performing the prediction, it may be based on palette coding. The palette coding is a useful technology to represent blocks including a small number of unique color values. Instead of applying the prediction and transform to the block, in a palette mode, an index is signaled to represent the value of each sample. The palette mode is useful to save a video memory buffer space. The block may be coded using the palette mode (e.g., MODE_PLT). In order to decode the encoded block as described above, the decoder should decode a pallet entry and an index. The palette entry may be represented by a palette table, and may be encoded by a palette table coding tool.

The palette coding may be called an (intra) palette mode or an (intra) palette coding mode. The current block may be reconstructed according to the palette coding or palette mode. The palette coding may be seen as an example of intra coding, or may be seen as one of intra prediction methods. However, in a similar manner to the above-described skip mode, a separate residual value for the corresponding block may not be signaled.

For example, in case that the palette mode is selected, information on a palette table may be signaled. The palette table may include an index corresponding to each pixel. The palette table may configure a palette prediction table from pixel values used in the previous block. For example, previously used pixel values may be stored in a specific buffer (palette predictor), and palette predictor information palette_predictor_run for configuring the current palette may be received from the buffer. That is, the palette predictor may include data representing an index for at least a part of a palette index map of the current block. In case that the palette entry for expressing the current block is not enough as a palette prediction entry configured from the palette predictor, pixel information on the current palette entry may be separately transmitted.

The palette mode may be signaled at a CU level, and may be generally used in case that most pixels in the CU may be represented as a set of representative pixel values. That is, in the palette mode, samples in the CU may be expressed as a set of representative pixel values. Such a set may be referred to as a palette. In case of a sample having a value close to the pixel value in the palette, a palette index palette_idx_idc corresponding to the pixel value in the palette or information capable of indicating the index (run copy flag, copy_above_palette_indices_flag) may be signaled. In case of a sample having a pixel value excluding the palette entry, the sample may be indicated as an escape symbol, and a quantized sample value may be directly signaled. In the present document, the pixel or the pixel value may be referred to as the sample or the sample value.

In order to decode a block coded in a palette mode, the decoder requires palette entry information and palette index information. In case that the palette index corresponds to the escape symbol, a (quantized) escape value may be signaled as an additional component. Further, the encoder should derive a proper palette for the corresponding CU, and transfer the palette to the decoder.

For efficient coding of the pallet entry, a palette predictor may be maintained. The palette predictor and the maximum size of the palette may be signaled through SPS. Further, the palette predictor and the maximum size of the palette may be predefined. For example, the palette predictor and the maximum size of the palette may be defined as 31 and 15, respectively, depending on whether the current block is a single tree or a dual-tree. In VVC standards, sps_palette_enabled_flag representing whether the palette mode is enabled may be transmitted. Then, a pred_mode_plt_coding flag representing whether the current coding unit is coded in the palette mode may be transmitted. The palette predictor may be initialized at the beginning of each brick or each slice.

With respect to each entry in the palette predictor, a reuse flag may be signaled, and may represent whether the entry is a part of the current pallet. The reuse flag may be transmitted using run-length coding of 0. Thereafter, the number of new palette entries may be signaled using the $0^{th}$-order exponential Golomb coding. Last, a component value for the new palette entry may be signaled. After the current CU is encoded, the palette predictor may be updated using the current palette, and the entry of the previous palette predictor that is not reused in the current palette may be added to the end of the new palette predictor (palette stuffing) until it reaches the allowable maximum size.

In order to code a palette index map, the index may be coded using horizontal and vertical traverse scans. The scan order may be explicitly signaled from the bitstream using the flag information (e.g., palette_transpose_flag).

Meanwhile, the palette index may be coded using two kinds of palette sample modes, and for example, "INDEX" mode and "COPY ABOVE" mode may be used. Such palette modes may be signaled using a flag representing whether the palette mode is the "INDEX" mode or the "COPY ABOVE" mode. In this case, the escape symbol may be signaled in the "INDEX" mode, and an index having the same size as the current palette size may be allocated. For example, if it is assumed that the size of the current palette is 10, No. 0 to No. 9 indexes may mean entry indexes in the palette, and No. 10 index may mean an index for the escape symbol. In case that the horizontal scan is used, the flag may be signaled excluding the top row, and in case that the vertical scan is used, or the previous mode is the "COPY_ABOVE" mode, the flag may be signaled excluding the first column. In the "COPY_ABOVE" mode, the palette index of the sample of the row on the top may be copied. In the "INDEX" mode, the palette index may be explicitly signaled. In both the "INDEX" mode and the "COPY_ABOVE" mode, the run value representing the number of next samples being coded using the same mode may be signaled. In case that the escape symbol is a part of the run in the "INDEX" mode or the "COPY_ABOVE" mode, escape component values may be signaled with respect to each escape symbol.

The coding of the palette index may be as follows. First, the number of indexes for the CU may be signaled. Next, actual indexes for the whole CU may be signaled using fixed length coding. The number of indexes and the index may be coded in the bypass mode. Through this, index-related bypass bins may be grouped together. Next, the palette sample mode copy_above_palette_indices_flag and the run may be signaled in an interleaved manner. Last, component escape values corresponding to the escape samples for the whole CU may be grouped together, and may be coded in the bypass mode.

Table 4 below represents an example of a syntax structure including syntax elements related to the palette mode based coding for the coding unit, and Table 5 below represents semantics for syntax elements included in the syntax of Table 4.

TABLE 4

| | Descriptor |
|---|---|

```
palette_coding( x0, y0, cbWidth, cbHeight, treeType ) {
    startComp = ( treeType = = DUAL_TREE_CHROMA ) ? 1 : 0
    numComps = ( treeType = = SINGLE_TREE ) ? ( sps_chroma_format_idc = = 0 ? 1 :
```

TABLE 4-continued

| | Descriptor |
|---|---|
| 3 ) : ( treeType = = DUAL_TREE_CHROMA ) ? 2 : 1 | |
| maxNumPaletteEntries = ( treeType = = SINGLE_TREE ) ? 31 : 15 | |
| palettePredictionFinished = 0 | |
| NumPredictedPaletteEntries = 0 | |
| for( predictorEntryIdx = 0; predictorEntryIdx < PredictorPaletteSize[ startComp ] | |
|   && !palettePredictionFinished && NumPredictedPaletteEntries < | |
|   maxNumPaletteEntries; predictorEntryIdx++ ) { | |
|   palette_predictor_run | ae(v) |
|   if( palette_predictor_run != 1 ) { | |
|     if( palette_predictor_run > 1 ) | |
|       predictorEntryIdx += palette_predictor_run − 1 | |
|     PalettePredictorEntryReuseFlags[ predictorEntryIdx ] = 1 | |
|     NumPredictedPaletteEntries++ | |
|   } else | |
|     palettePredictionFinished = 1 | |
| } | |
| if( NumPredictedPaletteEntries < maxNumPaletteEntries ) | |
|   num_signalled_palette_entries | ae(v) |
| for( cIdx = startComp; cIdx < ( startComp + numComps ); cIdx++ ) | |
|   for( i = 0; i < num_signalled_palette_entries; i++ ) | |
|     new_palette_entries[ cIdx ][ i ] | ae(v) |
| if( CurrentPaletteSize[ startComp ] > 0 ) | |
|   palette_escape_val_present_flag | ae(v) |
| if( MaxPaletteIndex > 0 ) { | |
|   adjust = 0 | |
|   palette_transpose_flag | ae(v) |
| } | |
| if( treeType != DUAL_TREE_CHROMA && palette_escape_val_present_flag ) | |
|   if( pps_cu_qp_delta_enabled_flag && !IsCuQpDeltaCoded ) { | |
|     cu_qp_delta_abs | ae(v) |
|     if( cu_qp_delta_abs ) | |
|       cu_qp_delta_sign_flag | ae(v) |
|   } | |
| if( treeType != DUAL_TREE_LUMA && palette_escape_val_present_flag ) | |
|   if( sh_cu_chroma_qp_offset_enabled_flag && !IsCuChromaQpOffsetCoded ) { | |
|     cu_chroma_qp_offset_flag | ae(v) |
|     if( cu_chroma_qp_offset_flag && pps_chroma_qp_offset_list_len_minus 1 > 0 ) | |
|       cu_chroma_qp_offset_idx | ae(v) |
|   } | |
| PreviousRunPosition = 0 | |
| PreviousRunType = 0 | |
| for( subSetId = 0; subSetId <= (cbWidth * cbHeight − 1 ) / 16; subSetId++ ) { | |
|   minSubPos = subSetId * 16 | |
|   if( minSubPos + 16 > cb Width * cbHeight) | |
|     maxSubPos = cbWidth * cbHeight | |
|   else | |
|     maxSubPos = minSubPos + 16 | |
|   RunCopyMap[ x0 ][ y0 ] = 0 | |
|   PaletteScanPos = minSubPos | |
|   log2CbWidth = Log2( cbWidth ) | |
|   log2CbHeight = Log2( cbHeight ) | |
|   while( PaletteScanPos < maxSubPos ) { | |
|     xC = x0+TraverseScanOrder[log2CbWidth][log2CbHeight][PaletteScanPos][0] | |
|     yC = y0+TraverseScanOrder[log2CbWidth][log2CbHeight][PaletteScanPos][1] | |
|     if( PaletteScanPos > 0 ) { | |
|       xcPrev = x0 + | |
|         TraverseScanOrder[log2CbWidth][log2CbHeight][PaletteScanPos−1][0] | |
|       ycPrev = y0 + | |
|         TraverseScanOrder[log2CbWidth][log2CbHeight][PaletteScanPos−1][1] | |
|     } | |
|     if( MaxPaletteIndex > 0 && PaletteScanPos > 0 ) { | |
|       run_copy_flag | ae(v) |
|       RunCopyMap[ xC ][ yC ] = run_copy_flag | |
|     } | |
|     CopyAboveIndicesFlag[ xC ][ yC ] = 0 | |
|     if( MaxPaletteIndex > 0 && !RunCopyMap[ xC ][ yC ] ) { | |
|       if( ( ( !palette_transpose_flag && yC > y0 ) || | |
|         ( palette_transpose_flag && xC > x0 ) ) && | |
|           CopyAboveIndicesFlag[ xcPrev ][ ycPrev ] = = 0 && | |
|           PaletteScanPos > 0 ) { | |
|         copy_above_palette_indices_flag | ae(v) |
|         CopyAboveIndicesFlag[ xC ][ yC ] = copy_above_palette_indices_flag | |
|       } | |
|       PreviousRunType = CopyAboveIndicesFlag[ xC ][ yC ] | |
|       PreviousRunPosition = PaletteScanPos | |
|     } else if( PaletteScanPos > 0 ) | |
|       Copy AboveIndicesFlag[xC][yC] = CopyAboveIndicesFlag[xcPrev][ycPrev] | |
|     PaletteScanPos ++ | |

TABLE 4-continued

| | Descriptor |
|---|---|
| ```
            }
            PaletteScanPos = minSubPos
            while( PaletteScanPos < maxSubPos ) {
               xC = x0 +
                  TraverseScanOrder[ log2CbWidth ][ log2CbHeight ][ PaletteScanPos ][ 0 ]
               yC = y0 +
                  TraverseScanOrder[ log2CbWidth ][ log2CbHeight ][ PaletteScanPos ][ 1 ]
               if( PaletteScanPos > 0 ) {
                  xcPrev =x0 +
                     TraverseScanOrder[log2CbWidth][log2CbHeight][PaletteScanPos−1][0]
                  ycPrev = y0 +
                     TraverseScanOrder[log2CbWidth][log2CbHeight][PaletteScanPos−1][1]
               }
               if( MaxPaletteIndex > 0 && !RunCopyMap[ xC ][ yC ] &&
                  CopyAboveIndicesFlag[ xC ][ yC ] = = 0 ) {
                  if( MaxPaletteIndex − adjust > 0 )
                     palette_idx_idc
                  adjust = 1
               }
               if( !RunCopyMap[ xC ][ yC ] && CopyAboveIndicesFlag[ xC ][ yC ] = = 0 )
                  CurrPaletteIndex = palette_idx_idc
               if( CopyAboveIndicesFlag[ xC ][ yC ] = = 0 )
                  PaletteIndexMap[ xC ][ yC ] = CurrPaletteIndex
               else if( !palette_transpose_flag )
                  PaletteIndexMap[ xC ][ yC ] = PaletteIndexMap[ xC ][ yC − 1 ]
               else
                  PaletteIndexMap[ xC ][ yC ] = PaletteIndexMap[ xC − 1 ][ yC ]
               PaletteScanPos ++
            }
            if( palette_escape_val_present_flag ) {
               for( cIdx = startComp; cIdx < ( startComp + numComps ); cIdx++ ) {
                  for( sPos = minSubPos; sPos < maxSubPos; sPos++ ) {
                     xC = x0 + TraverseScanOrder[ log2CbWidth][ log2CbHeight ][ sPos ][ 0 ]
                     yC = y0 + TraverseScanOrder[ log2CbWidth][ log2CbHeight ][ sPos ][ 1 ]
                     if( !( treeType = = SINGLE_TREE && cIdx != 0 &&
                        ( xC % SubWidthC != 0 || yC % SubHeightC != 0 ) ) ) {
                        if( PaletteIndexMap[ cIdx ][ xC ][ yC ] = = MaxPaletteIndex ) {
                           palette_escape_val
                           PaletteEscapeVal[ cIdx ][ xC ][ yC ] = palette_escape_val
                        }
                     }
                  }
               }
            }
         }
      }
   }
}
``` | ae(v)<br><br><br><br><br><br><br><br><br><br><br><br><br><br><br><br><br><br><br><br><br><br><br><br><br><br><br><br><br><br>ae(v) |

TABLE 5

In the following semantics, the array indices x0, y0 specify the location ( x0, y0 ) of
the top-left luma sample of the considered coding block relative to the top-left luma
sample of the picture. The array indices xC, yC specify the location ( xC, yC ) of the
sample relative to the top-left luma sample of the picture, when treeType is equal to
SINGLE_TREE or DUAL_TREE_LUMA; and relative to the top-left chroma
sample of the picture, when treeType is equal to DUAL_TREE_CHROMA. The
array index startComp specifies the first colour component of the current palette
table. startComp equal to 0 indicates the Y component; startComp equal to 1 indicates
the Cb component; startComp equal to 2 indicates the Cr component. numComps
specifies the number of colour components in the current palette table.
The predictor palette consists of palette entries from previous coding units that are
used to predict the entries in the current palette.
PredictorPaletteSize[ startComp ] specifies the size of the predictor palette for the
first colour component of the current palette table startComp.
PredictorPaletteSize[ startComp ] is derived as specified in subclause 8.4.5.3.
PalettePredictorEntryReuseFlags[ i ] equal to 1 specifies that the i-th entry in the
predictor palette is reused in the current palette. PalettePredictorEntryReuseFlags[ i ]
equal to 0 specifies that the i-th entry in the predictor palette is not an entry in the
current palette. All elements of the array PalettePredictorEntryReuseFlags[ i ] are
initialized to 0.
palette_predictor_run is used to determine the number of zeros that precede a non-
zero entry in the array PalettePredictorEntryReuseFlags.
It is a requirement of bitstream conformance that the value of palette_predictor_run
shall be in the range of 0 to
( PredictorPaletteSize[ startComp ] − predictorEntryIdx ), inclusive, where
predictorEntryIdx corresponds to the current position in the array TABLE 5-continued PalettePredictorEntryReuseFlags. The variable NumPredictedPaletteEntries
specifies the number of entries in the current palette that are reused from the predictor
palette. The value of NumPredictedPaletteEntries shall be in the range of 0 to
maxNumPaletteEntries, inclusive.
num_signalled_palette_entries specifies the number of entries in the current palette
that are explicitly signalled for the first colour component of the current palette table
startComp.
When num_signalled_palette_entries is not present, it is inferred to be equal to 0.
The variable CurrentPaletteSize[ startComp ] specifies the size of the current palette
for the first colour component of the current palette table startComp and is derived as
follows:
    CurrentPaletteSize[ startComp ] = NumPredictedPaletteEntries +
    num_signalled_palette_entries                       (176)
The value of CurrentPaletteSize[ startComp ] shall be in the range of 0 to
maxNumPaletteEntries, inclusive.
new_palette_entries[ cIdx ][ i ] specifies the value for the i-th signalled palette entry
for the colour component cIdx.
The variable LocalDualTreeFlag is derived as follows:
    LocalDualTreeFlag = ( treeType != SINGLE_TREE &&
    ( sh_slice_type != I || ( sh_slice_type = = I &&
    sps_qtbtt_dual_tree_intra_flag = = 0 ) ) ) ? 1 : 0        (177)
The variable PredictorPaletteEntries[ cIdx ][ i ] specifies the i-th element in the
predictor palette for the colour component cIdx.
The variable CurrentPaletteEntries[ cIdx ][ i ] specifies the i-th element in the current
palette for the colour component cIdx and is derived as follows:
  numPredictedPaletteEntries = 0
  for( i = 0; i < PredictorPaletteSize[ startComp ]; i++ )
    if( PalettePredictorEntryReuseFlags[ i ] ) {
      for( cIdx = LocalDualTreeFlag ? 0 : startComp;
      cIdx < LocalDualTreeFlag ? 3 : ( startComp + numComps ); cIdx++ )
      CurrentPaletteEntries[ cIdx ][ numPredictedPaletteEntries ] =
                                      PredictorPaletteEntries[ cIdx ][ i ]
      numPredictedPaletteEntries++
    }
  for( cIdx = startComp; cIdx < (startComp + numComps); cIdx++)    (178)
    for( i = 0; i < num_signalled_palette_entries; i++ )
      CurrentPaletteEntries[ cIdx ][ numPredictedPaletteEntries + i ] =
                                      new_palette_entries[ cIdx ][ i ]
palette_escape_val_present_flag equal to 1 specifies that the current coding unit
contains at least one escape coded sample. palette_escape_val_present_flag equal to
0 specifies that there are no escape coded samples in the current coding unit. When
not present, the value of palette_escape_val_present_flag is inferred to be equal to 1.
The variable MaxPaletteIndex specifies the maximum possible value for a palette
index for the current coding unit. The value of MaxPaletteIndex is set equal to
CurrentPaletteSize[ startComp ] − 1 + palette_escape_val_present_flag.
palette_idx_idc is an indication of an index to the palette table,
CurrentPaletteEntries. The value of palette_idx_idc shall be in the range of 0 to
MaxPaletteIndex, inclusive, for the first index in the block and in the range of 0 to
( MaxPaletteIndex − 1 ), inclusive, for the remaining indices in the block.
When palette_idx_idc is not present, it is inferred to be equal to 0.
palette_transpose_flag equal to 1 specifies that vertical traverse scan is applied for
scanning the indices for samples in the current coding unit. palette_transpose_flag
equal to 0 specifies that horizontal traverse scan is applied for scanning the indices
for samples in the current coding unit. When not present, the value of
palette_transpose_flag is inferred to be equal to 0.
The array TraverseScanOrder specifies the scan order array for palette coding. If
palette_transpose_flag is equal to 0, TraverseScanOrder is assigned the horizontal
scan order HorTravScanOrder. Otherwise (palette_transpose_flag is equal to 1),
TraverseScanOrder is assigned the vertical scan order VerTravScanOrder.
run_copy_flag equal to 1 specifies that the palette run type is the same as the run
type at the previously scanned position and palette index is the same as the index at
the previous scanned position if CopyAboveIndicesFlag[ xC ][ yC ] is equal to 0.
Otherwise, run_copy_flag equal to 0 specifies that the palette run type is different
from the run type at the previously scanned position
copy_above_palette_indices_flag equal to 1 specifies that the palette index is equal
to the palette index at the same location in the row above if horizontal traverse scan
is used or the same location in the left column if vertical traverse scan is used.
copy_above_palette_indices_flag equal to 0 specifies that an indication of the palette
index of the sample is coded in the bitstream or inferred.
The variable CopyAboveIndicesFlag[ xC ][ yC ] equal to 1 specifies that the palette
index is copied from the palette index in the row above (horizontal scan) or left
column (vertical scan). CopyAboveIndicesFlag[ xC ][ yC ] equal to 0 specifies that
the palette index is explicitly coded in the bitstream or inferred.
The variable PaletteIndexMap[ xC ][ yC ] specifies a palette index, which is an index
to the array represented by CurrentPaletteEntries. The value of
PaletteIndexMap[ xC ][ yC ] shall be in the range of 0 to MaxPaletteIndex, inclusive.
The variable adjustedRefPaletteIndex is derived as follows:
    adjustedRefPaletteIndex = MaxPaletteIndex + 1
    if( PaletteScanPos > 0 ) {
      xcPrev = x0 +

TABLE 5-continued

```
    TraverseScanOrder[log2CbWidth][log2bHeight][PaletteScanPos−1][0]
  ycPrev = y0 +
    TraverseScanOrder[log2CbWidth][log2bHeight][PaletteScanPos−1][1]
  if( CopyAboveIndicesFlag[ xcPrev ][ ycPrev ] = = 0 )
    adjustedRefPaletteIndex = PaletteIndexMap[xcPrev][ycPrev]      (179)
  else {
    if( !palette_transpose_flag )
      adjustedRefPaletteIndex = PaletteIndexMap[ xC ][ yC − 1 ]
    else
      adjustedRefPaletteIndex = PaletteIndexMap[ xC − 1 ][ yC ]
  }
  }
When CopyAboveIndicesFlag[ xC ][ yC ] is equal to 0, the variable CurrPaletteIndex
is derived as follows:
  if( CurrPaletteIndex >= adjustedRefPaletteIndex )
    CurrPaletteIndex++                                             (180)
palette_escape_val specifies the quantized escape coded sample value for a
component.
The variable PaletteEscapeVal[ cIdx ][ xC ][ yC ] specifies the escape value of a
sample for which PaletteIndexMap[ xC ][ yC ] is equal to MaxPaletteIndex and
palette_escape_val_present_flag is equal to 1. The array index cIdx specifies the
colour component.
It is a requirement of bitstream conformance that
PaletteEscapeVal[ cIdx ][ xC ][ yC ] shall be in the range of 0 to
(1 << BitDepth ) − 1, inclusive.
```

Referring to Table 4 and Table 5 above, in case that a palette mode is applied for the current block (i.e., current coding unit), the palette coding syntax (e.g., palette_coding( )) as in Table 4 above may be parsed/signaled.

For example, the palette table may be configured based on the palette entry information. The palette entry information may include syntax elements, such as palette_predictor_run, num_signalled_palette entries, and new_palette_entries.

Further, a palette index map for the current block may be configured based on the palette index information. The palette index information may include syntax elements, such as num_palette_indices_minus1, palette_idx_idc, and palette_transpose_flag. Based on the palette index information as described above, the palette index map (e.g., PaletteIndexMap) may be configured by deriving the palette index (e.g., PaletteIndexIdc) for the samples in the current block while circulating in accordance with a traverse scan direction (vertical direction or horizontal direction).

Further, based on the palette index map, a sample value for the palette entry in the palette table may be derived, and reconstructed samples of the current block may be generated based on the sample value mapped on the palette entry.

Further, in case that a sample having an escape value is present (i.e., in case that the value of the palette_escape_val_present_flag is 1) in the current block, the escape value for the current block may be derived based on the escape information. The escape information may include syntax elements, such as palette_escape_val_present_flag and palette_escape_val. For example, based on the quantized escape value information (e.g., palette_escape_val), the escape value for the escape-coded sample in the current block may be derived. The reconstructed samples of the current block may be generated based on the escape value.

Meanwhile, in the encoding/decoding process, block differential pulse coded modulation or block-based delta pulse code modulation (BDPCM) technique may be used. The BDPCM may be named quantized residual block-based delta pulse code modulation (RDPCM).

In case that the block is predicted by applying the BDPCM, reconstructed samples may be utilized in order to predict rows or columns of the block line by line. In this case, a used reference sample may be a non-filtered sample. The BDPCM direction may represent whether a vertical direction or horizontal direction prediction has been used. That is, in case that the BDPCM is applied, the vertical direction or the horizontal direction may be selected as the BDPCM direction, and the prediction may be performed in the BDPCM direction. A prediction error may be quantized in a spatial domain, and the sample may be reconstructed by adding the dequantized prediction error to the prediction (i.e., prediction sample). The prediction error may mean the residual. The quantized residual domain BDPCM may be proposed as an alternative of the BDPCM, and the prediction direction or signaling may be equal to the BDPCM applied to the spatial domain. That is, the residual may be reconstructed through the dequantization after the quantization coefficients themselves are built up like delta pulse code modulation (DPCM) through the quantized residual domain BDPCM. Accordingly, the quantized residual domain BDPCM may be used as the meaning that a residual coding end applies the DPCM. The quantized residual domain used hereinafter is obtained by quantizing the residual derived based on the prediction without being transformed, and means a domain for the quantized residual sample. For example, the quantized residual domain may include the quantized residual (or quantized residual coefficient) to which the transform skip is applied, that is, the transform is skipped with respect to the residual sample, but the quantization is applied thereto. Further, for example, the quantized residual domain may include the quantized transform coefficient.

As described above, the BDPCM may be applied to the quantized residual domain, the quantized residual domain may include the quantized residual (or quantized residual coefficient), and in this case, the transform skip may be applied with respect to the residual. That is, in case that the BDPCM is applied, the transform may be skipped and the quantization may be applied with respect to the residual sample. Further, the quantized residual domain may include the quantized transform coefficient. A flag representing whether the BDPCM is applicable may be signaled at a sequence level (SPS), and such a flag may be signaled only in case of being signaled that the transform skip mode is possible at the SPS. The flag may be called a BDPCM enabled flag or SPS BDPCM enabled flag.

In case of applying the BDPCM, intra prediction may be performed with respect to entire blocks by sample copy according to a prediction direction (e.g., vertical prediction or horizontal prediction) similar to the intra prediction direction. The residual that is the difference value between the original and the prediction blocks may be quantized through skipping of the transform, and a delta value, that is, the difference value between the quantized residual and the predictor in the horizontal or vertical direction (i.e., quantized residual in the horizontal or vertical direction), may be coded.

If the BDPCM is applicable, the CU size may be equal to or smaller than MaxTsSize (maximum transform skip block size) for the luma sample, and in case that the CU is coded through intra prediction, the flag information may be transmitted at the CU level. The flag information may be called the BDPCM flag. Here, the MaxTsSize may mean the maximum block size for the transform skip mode to be allowed. The flag information may indicate whether typical intra coding is applied or the BDPCM is applied. If the BDPCM is applied, a BDPCM prediction direction flag indicating whether the prediction direction is the horizontal direction or the vertical direction may be transmitted. The BDPCM prediction direction flag may be called a BDPCM direction flag. Thereafter, the block may be predicted through a typical horizontal or vertical intra prediction process using a non-filtered reference sample. Further, the residual may be quantized, and the difference value between the quantized residual and the predictor, for example, between already quantized residuals in surrounding positions in the horizontal or vertical direction according to the BDPCM prediction direction may be coded.

Meanwhile, as described above, information (syntax element) in a syntax table disclosed in the present document may be included in image/video information, and may be configured/encoded by the encoding apparatus to be transferred to the decoding apparatus in the form of a bitstream. The decoding apparatus may parse/decode the information (syntax element) in the corresponding syntax table. The decoding apparatus may perform a decoding process (prediction, (transform skip based) residual process, BDPCM, and palette coding) for the current block based on the decoded information.

Hereinafter, in the present document, an efficient scheme for parsing/signaling a syntax element having dependency is proposed with respect to a transform skip related high-level syntax element and/or palette coding related high-level syntax element. That is, according to an embodiment of the present document, during the video/image coding, whether to perform coding may be classified in accordance with dependency and non-dependency of information which is absolutely necessary or auxiliary used in performing the transform skip and/or palette coding, and thus efficient coding may be performed.

In video coding, a switch of a coding tool may be defined in a specific high-level syntax (HLS). In case of the VVC in the related art, flag information on respective coding tools may be defined in the SPS. Further, in the VVC, standardization has been in progress towards having independence among respective high-level syntax sets (e.g., video parameter set (VPS), sequence parameter set (SPS), picture parameter set (PPS), adaptation parameter set (APS), decoding parameter set (DPS), and slice header). Accordingly, in the high-level syntax set in which a flag of a coding tool is present, a plurality of syntax elements having dependency are present. In embodiment(s) of the present document, a method for parsing/signaling a high-level syntax element having dependency in accordance with the transform skip and/or palette coding is proposed.

As an embodiment, the present document proposes a method for saving bits being transmitted by enabling the syntax element having dependency to determine whether to perform parsing/signaling in accordance with the dependent condition with respect to the transform skip related high-level syntax element. As an example, a method for parsing the high-level syntax element having dependency depending on whether to use the transform skip by the transform skip (enabled) flag is proposed.

For example, as syntax elements dependent on the transform skip based coding, there are a transform skip (enabled) flag (e.g., sps_transform_skip_enabled_flag), minimum quantization parameter information for transform skip (e.g., min_qp_prime_ts_minus4), and information on whether to apply the BDPCM (e.g., sps_bdpcm_enabled_flag). As an example, if the value of the transform skip (enabled) flag is defined as 1, the related flag or information syntax elements should be necessarily transmitted, whereas if the value of the transform skip (enabled) flag is defined as 0, the syntax elements excluding the transform skip (enabled) flag syntax element may not be transmitted.

That is, a method for transmitting a high-level syntax element is proposed, which is dependent on whether to perform the transform skip, such as the minimum quantization parameter information for the transform skip block and whether to apply the BDPCM, during the transform skip in accordance with the value of the transform skip (enabled) flag in the high-level syntax HLS (e.g., VPS, SPS, PPS, APS, DPS, and slice header). Further, the proposed method is not limited to the syntax elements mentioned in the present embodiment, but may include all high-level syntax elements defined in the high-level syntax set which has dependency depending on whether to perform the transform skip and which includes the transform skip (enabled) flag.

As described above, the syntax elements related to the transform skip based coding may be defined in the high-level syntax set, and may be defined in a sequence parameter set (SPS) as in an embodiment in Table 6 below.

TABLE 6

| | Descriptor |
|---|---|
| seq_parameter_set_rbsp( ) { | |
| (...) | |
| sps_transform_skip_enabled_flag | u(1) |
| if( sps_transform_skip_enabled_flag ) { | |
| sps_bdpcm_enabled_flag | u(1) |
| min_qp_prime_ts_minus4 | ue(v) |
| } | |
| (...) | |
| rbsp_trailing_bits( ) | |
| } | |

Further, for example, the semantic of a syntax element for the above-described embodiment among syntax elements of the SPS syntax may be represented as in Table 7 below.

TABLE 7 sps_transform_skip_enabled_flag equa to 1 specifies that transform_skip_flag
may be present in the transform unit syntax. sps_transform_skip_enabled_flag
equal to 0 specifies that transform_skip_flag is not present in the transform unit
syntax.
sps_bdpcm_enabled_flag equal to 1 specifies that intra_bdpcm_flag may be
present in the coding unit syntax for intra coding units. sps_bdpcm_enabled_flag
equal to 0 specifies that intra_bdpcm_flag is not present in the coding unit syntax
for intra coding units. When not present, the value of sps_bdpcm_enabled_flag is
inferred to be equal to 0.
min_qp_prime_ts_minus4 specifies the minimum allowed quantization
parameter for transform skip mode as follows:
QpPrimeTsMin = 4 + min_qp_prime_ts_minus4

Referring to Table 6 and Table 7 above, syntax elements related to the transform skip may be defined in the SPS, and may include syntax elements of sps_transform_skip_enabled_flag, sps_bdpcm_enabled_flag, and min_qp_prime_ts_minus4.

The sps_transform_skip_enabled_flag syntax element may represent whether the transform skip is enabled based on whether the value thereof is 0 or 1. For example, if the value of the sps_transform_skip_enabled_flag is 1, it may represent that the transform skip is enabled, and in this case, the transform_skip_flag may be parsed/signaled through a transform unit syntax. Here, the transform_skip_flag syntax element may represent whether the transform can be applied to the corresponding associated transform block. If the value of the sps_transform_skip_enabled_flag is 0, it may represent that the transform skip is not enabled, and in this case, the transform_skip_flag may not be parsed/signaled in the transform unit syntax. In other words, based on the transform skip enabled flag sps_transform_skip_enabled_flag, it may be represented whether the transform_skip_flag is present in the transform unit syntax.

The sps_bdpcm_enabled_flag syntax element may represent whether the BDPCM is enabled based on whether the value thereof is 0 or 1. For example, if the value of sps_bdpcm_enabled_flag is 1, it may represent that the BDPCM is enabled, and in this case, the intra_bdpcm_flag (or intra_bdpcm_luma_flag and intra_bdpcm_chroma_flag) may be parsed/signaled through the coding unit syntax for the intra coding unit. Here, the intra_bdpcm_flag syntax element may represent whether the BDPCM is applied to the current coding block. If the value of the sps_bdpcm_enabled_flag is 0, it may represent that the BDPCM is not enabled, and in this case, the intra_bdpcm_flag (or intra_bdpcm_luma_flag and intra_bdpcm_chroma_flag) may not be parsed/signaled in the coding unit syntax for the intra coding unit. In other words, it may be represented whether the intra_bdpcm_flag (or intra_bdpcm_luma_flag and intra_bdpcm_chroma_flag) is present in the coding unit syntax based on the BDPCM enabled flag sps_bdpcm_enabled_flag.

The min_qp_prime_ts_minus4 syntax element may represent the minimum allowed quantization parameter allowed for the transform skip mode. For example, based on the min_qp_prime_ts_minus4 syntax element, the minimum quantization parameter value (e.g., QpPrimeTsMin) in the transform skip mode may be derived. Based on the minimum quantization parameter in the transform skip mode, the quantization parameter being used in a scaling process (dequantization process) may be derived. Further, a scaled transform coefficient (dequantized transform coefficient) may be derived by performing the scaling process (dequantization process) for the current block based on the quantization parameter, and based on this, a residual sample of the current block may be derived.

Further, in the SPS, syntax elements having dependency may be defined with respect to the transform skip enabled flag syntax element (e.g., sps_transform_skip_enabled_flag) among the syntax elements related to the transform skip. For example, as disclosed in Table 6 and Table 7 above, based on the value of the transform skip enabled flag (e.g., sps_transform_skip_enabled_flag) in the SPS, the min_qp_prime_ts_minus4 syntax element representing the minimum quantization parameter information for the transform skip block in the transform skip mode and the sps_bdpcm_enabled_flag syntax element representing whether the BDPCM is enabled may have dependency. As an example, if the value of the transform kip enabled flag (e.g., sps_transform_skip_enabled_flag) is 1, the min_qp_prime_ts_minus4 syntax element and the sps_bdpcm_enabled_flag syntax element may be parsed/signaled. Further, if the value of the transform skip enabled flag (e.g., sps_transform_skip_enabled_flag) is 0, the min_qp_prime_ts_minus4 syntax element and the sps_bdpcm_enabled_flag syntax element may not be parsed/signaled.

Further, as an embodiment, the present document proposes a method for saving bits being transmitted by enabling the syntax element having dependency to determine whether to perform parsing/signaling according to the dependent condition with respect to the transform skip related high-level syntax element. As an example, proposed is a method for parsing the high-level syntax element having dependency depending on whether the transform skip by the transform skip (enabled) flag is used.

For example, as syntax elements dependent on the transform skip based coding, there are a transform skip (enabled) flag (e.g., sps_transform_skip_enabled_flag), information on the transform skip application size (e.g., log 2_transform_skip_max_size_minus2), minimum quantization parameter information for the transform skip (e.g., min_qp_prime_ts_minus4), and information on whether the BDPCM is applied (e.g., sps_bdpcm_enabled_flag). As an example, if the value of the transform skip (enabled) flag is defined as 1, the related flag or information syntax elements should be necessarily transmitted, whereas if the value of the transform skip (enabled) flag is defined as 0, the syntax elements excluding the transform skip (enabled) flag syntax element may not be transmitted.

That is, a method for transmitting a high-level syntax element is proposed, which is dependent on whether to perform the transform skip, such as information on the maximum size of the transform skip application, the minimum quantization parameter information, and whether to apply the BDPCM during the transform skip, in accordance with the value of the transform skip (enabled) flag in the high-level syntax HLS (e.g., VPS, SPS, PPS, APS, DPS, and slice header). Further, the proposed method is not limited to the syntax elements mentioned in the present embodiment, but may include all high-level syntax elements defined in the high-level syntax set which has dependency depending on whether to perform the transform skip and which includes the transform skip (enabled) flag.

As described above, the syntax elements related to the transform skip based coding may be defined in the high-level syntax set, and may be defined in the sequence parameter set (SPS) as in an embodiment of Table 8 below. However, the maximum block size information for the transform skip that is defined in a picture parameter set (PPS) in the related art may be newly defined in the SPS to avoid dependency between HLSs, and this may be represented as in Table 8 below.

TABLE 8

| | Descriptor |
|---|---|
| seq_parameter_set_rbsp( ) { | |
| (...) | |
| sps_transform_skip_enabled_flag | u(1) |
| if( sps_transform_skip_enabled_flag ) { | |
| sps_bdpcm_enabled_flag | u(1) |
| min_qp_prime_ts_minus4 | ue(v) |
| log2_transform_skip_max_size_minus2 | ue(v) |
| } | |
| (...) | |
| rbsp_trailing_bits( ) | |
| } | |

Further, for example, the semantic of a syntax element for the above-described embodiment among syntax elements of the SPS syntax may be represented as in Table 9 below.

TABLE 9 sps_transform_skip_enabled_flag equa to 1 specifies that transform_skip_flag may be present in the transform unit syntax. sps_transform_skip_enabled_flag equal to 0 specifies that transform_skip_flag is not present in the transform unit syntax.
sps_bdpcm_enabled_flag equal to 1 specifies that intra_bdpcm_flag may be present in the coding unit syntax for intra coding units. sps_bdpcm_enabled_flag equal to 0 specifies that intra_bdpcm_flag is not present in the coding unit syntax for intra coding units. When not present, the value of sps_bdpcm_enabled_flag is inferred to be equal to 0.
min_qp_prime_ts_minus4 specifies the minimum allowed quantization parameter for transform skip mode as follows:
QpPrimeTsMin = 4 + min_qp_prime_ts_minus4
log2_transform_skip_max_size_minus2 specifies the maximum block size used for transform skip, and shall be in the range of 0 to 3.
When not present, the value of log2_transform_skip_max_size_minus2 is inferred to be equal to 0.
The variable MaxTsSize is set equal to 1 <<
( log2_transform_skip_max_size_minus2 + 2 ).

Referring to Table 8 and Table 9 above, the syntax elements related to the transform skip may be defined in the SPS, and may include syntax elements of sps_transform_skip_enabled_flag, sps_bdpcm_enabled_flag, min_qp_prime_ts_minus4, and log 2_transform_skip_max_size_minus2.

Here, since the syntax elements of the sps_transform_skip_enabled_flag, the sps_bdpcm_enabled_flag, and the min_qp_prime_ts_minus4 have been explained in detail in Table 6 and Table 7 above, in the present embodiment, the detailed explanation thereof will be omitted for convenience in explanation.

The log 2_transform_skip_max_size_minus2 syntax element may represent the maximum block size being used in the transform skip mode. In this case, the log 2_transform_skip_max_size_minus2 syntax element may be in the range of 0 to 3. For example, as disclosed in Table 9 above, the maximum block size (e.g., MaxTsSize) being used in the transform skip mode may be derived based on calculation such as 1<<(log 2_transform_skip_max_size_minus2+2).

Further, in the SPS, syntax elements having dependency may be defined with respect to the transform skip enabled flag syntax element (e.g., sps_transform_skip_enabled_flag) among syntax elements related to the transform skip. For example, as disclosed in Table 8 and Table 9 above, in the SPS, the sps_bdpcm_enabled_flag syntax element representing whether the BDPCM is enabled based on the value of the transform skip enabled flag (e.g., sps_transform_skip_enabled_flag), the min_qp_prime_ts_minus4 syntax element representing the minimum quantization parameter information for the transform skip block in the transform skip mode, and the log 2_transform_skip_max_size_minus2 syntax element representing the maximum block size being used in the transform skip mode may have the dependency. As an example, if the value of the transform skip enabled flag (e.g., sps_transform_skip_enabled_flag) is 1, syntax elements of the sps_bdpcm_enabled_flag, the min_qp_prime_ts_minus4, and the log 2_transform_skip_max_size_minus2 may be parsed/signaled. Further, if the value of the transform skip enabled flag (e.g., sps_transform_skip_enabled_flag) is 0, syntax elements of the sps_bdpcm_enabled_flag, the min_qp_prime_ts_minus4, and the log 2_transform_skip_max_size_minus2 may not be parsed/signaled.

Further, as an embodiment, the present document proposes a method for saving bits being transmitted by enabling the syntax element having dependency to determine whether to perform parsing/signaling according to the dependent condition with respect to the transform skip related high-level syntax element and the palette coding related high-level syntax element. As an example, proposed is a method for parsing the high-level syntax element having dependency by the transform skip (enabled) flag and/or the palette coding (enabled) flag.

For example, as syntax elements dependent on the transform skip based coding, there are a transform skip (enabled) flag (e.g., sps_transform_skip_enabled_flag), information on the transform skip application size (e.g., log 2_transform_skip_max_size_minus2), minimum quantization parameter information for the transform skip (e.g., min_qp_prime_ts_minus4), and information on whether the BDPCM is applied (e.g., sps_bdpcm_enabled_flag). Further, as described above, since the escape value is also not changed during the palette coding, the minimum quantization parameter information for the transform skip may be used in performing the quantization. Accordingly, the palette coding (enabled) flag (e.g., sps_palette_enabled_flag) for the palette mode based coding and the minimum quantization parameter information (e.g., min_qp_prime_ts_minus4) during the transform skip may have dependency. As an example, if the value of the transform skip (enabled) flag or the palette coding (enabled) flag is defined as 1, the related flag or the information syntax elements should be necessarily transmitted, whereas if the value of the transform skip (enabled) flag or the palette coding (enabled) flag is defined as 0, the syntax elements excluding the respective flag syntax element may not be transmitted.

That is, a method for transmitting a high-level syntax element is proposed, which is dependent on whether to perform the transform skip, such as information on the maximum size of the transform skip application, the minimum quantization parameter information during the transform skip, and whether to apply the BDPCM, or whether to perform the palette coding in accordance with the value of the transform skip (enabled) flag and/or the value of the palette coding (enabled) flag in the high-level syntax (e.g., VPS, SPS, PPS, APS, DPS, and slice header).

For example, (i) In case that both the transform skip (enabled) flag and the palette coding (enabled) flag are defined as 1, syntax elements corresponding to a union of syntax elements dependent on the transform skip (enabled) flag and the palette coding (enabled) flag may be parsed. (ii) In case that the transform skip (enabled) flag is defined as 1, and the palette coding (enabled) flag is 0, the syntax elements dependent on the transform skip (enabled) flag may be parsed. (iii) In case that the transform skip (enabled) flag is defined as 0, and the palette coding (enabled) flag is 1, the syntax elements dependent on the palette coding (enabled) flag may be parsed. (iv) In case that both the transform skip (enabled) flag and the palette coding (enabled) flag are 0, other high-level syntax elements having dependency on two coding tools may not be parsed.

The parsing order of the syntax elements mentioned in the present embodiment is not specifically limited, and in case that whether to perform parsing is determined according to the dependency between the syntax elements, they are considered to coincide with each other. Further, the proposed method is not limited to the syntax elements mentioned in the present embodiment, but may have dependency depending on whether the transform skip or the palette coding is performed, and may include all high-level syntax elements defined in the high-level syntax set including the transform skip (enabled) flag and the palette coding (enabled) flag.

As described above, the syntax elements related to the transform skip based coding and/or the palette mode based coding may be defined in the high-level syntax set, and may be defined in the sequence parameter set (SPS) as in an embodiment of Table 10 below.

TABLE 10

| | Descriptor |
|---|---|
| seq_parameter_set_rbsp( ) { | |
| (...) | |
| sps_transform_skip_enabled_flag | u(1) |
| if( sps_transform_skip_enabled_flag ) | |
| sps_bdpcm_enabled_flag | u(1) |
| (...) | |
| if( chroma_format_idc = = 3 ) | |
| sps_palette_enabled_flag | u(1) |
| (...) | |
| if( sps_transform_skip_enabled_flag \|\| | |
| sps_palette_enabled_flag ) | |
| min_qp_prime_ts_minus4 | ue(v) |
| (...) | |
| } | |

Further, for example, the semantic of the syntax element for the above-described embodiment among the syntax elements of the SPS syntax may be represented as in Table 11 below.

TABLE 11 sps_transform_skip_enabled_flag equa to 1 specifies that transform_skip_flag may be present in the transform unit syntax. sps_transform_skip_enabled_flag equal to 0 specifies that transform_skip_flag is not present in the transform unit syntax.
sps_bdpcm_enabled_flag equal to 1 specifies that intra_bdpcm_flag may be present in the coding unit syntax for intra coding units. sps_bdpcm_enabled_flag equal to 0 specifies that intra_bdpcm_flag is not present in the coding unit syntax for intra coding units. When not present, the value of sps_bdpcm_enabled_flag is inferred to be equal to 0.
min_qp_prime_ts_minus4 specifies the minimum allowed quantization parameter for transform skip mode as follows:
QpPrimeTsMin = 4 + min_qp_prime_ts_ minus4
sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

Referring to Table 10 and Table 11 above, in the SPS, syntax elements related to the transform skip and/or the palette coding may be defined, and may include syntax elements of the sps_transform_skip_enabled_flag, sps_bdpcm_enabled_flag, sps_palette_enabled_flag, and min_qp_prime_ts_minus4.

Here, since the syntax elements of the sps_transform_skip_enabled_flag, sps_bdpcm_enabled_flag, and min_qp_prime_ts_minus4 have been explained in detail in Table 6 to Table 9 above, in the present embodiment, for convenience in explanation, the detailed explanation thereof will be omitted.

The sps_palette_enabled_flag syntax element may represent whether the palette coding (i.e., palette prediction mode) is enabled based on whether the value thereof is 0 or 1. For example, if the value of the sps_palette_enabled_flag is 1, it may represent that the palette coding is enabled, and in this case, the pred_mode_plt_flag may be parsed/signaled through the coding unit syntax. Here, the pred_mode_plt_flag syntax element may represent whether the palette mode can be used for the current coding unit. If the value of the sps_palette_enabled_flag is 0, it may represent that the palette coding is not enabled, and in this case, the pred_mode_plt_flag may not be parsed/signaled in the coding unit syntax. In other words, based on the palette coding enabled flag sps_palette_enabled_flag, it may represent whether the pred_mode_plt_flag is present in the coding unit syntax.

Further, in the SPS, syntax elements having dependency may be defined with respect to the transform skip enabled flag syntax element (e.g., sps_transform_skip_enabled_flag) among syntax elements related to the transform skip and/or the palette coding. For example, as disclosed in Table 10 and Table 11 above, in the SPS, the sps_bdpcm_enabled_flag syntax element representing whether the BDPCM is enabled based on the value of the transform skip enabled flag (e.g., sps_transform_skip_enabled_flag) may have dependency. As an example, if the value of the transform skip enabled flag (e.g., sps_transform_skip_enabled_flag) is 1, the sps_bdpcm_enabled_flag syntax element may be parsed/signaled. Further, if the value of the transform skip enabled flag (e.g., sps_transform_skip_enabled_flag) is 0, the sps_bdpcm_enabled_flag syntax element may not be parsed/signaled.

Further, in the SPS, a dependent condition may be defined in relation to the palette coding enabled flag syntax element (e.g., sps_palette_enabled_flag) among the syntax elements related to the transform skip and/or the palette coding. For example, as disclosed in Table 10 and Table 11 above, in the SPS, the palette coding enabled flag syntax element (e.g., sps_palette_enabled_flag) may be parsed/signaled based on the chroma_format_idc syntax element. As an example, if the value of the chroma_format_idc syntax element is 3, the sps_palette_enabled_flag syntax element may be parsed/signaled.

Further, in the SPS, syntax elements having dependency may be defined with respect to the transform skip enabled flag syntax element (e.g., sps_transform_skip_enabled_flag) and/or the palette coding enabled flag syntax element (e.g., sps_palette_enabled_flag) among the syntax elements related to the transform skip and/or the palette coding. For example, as disclosed in Table 10 and Table 11 above, in the SPS, the min_qp_prime_ts_minus4 syntax element representing the minimum quantization parameter information for the transform skip mode may have dependency based on the value of the transform skip enabled flag (e.g., sps_transform_skip_enabled_flag) and/or the palette coding enabled flag syntax element (e.g., sps_palette_enabled_flag). As an example, in case that the value of the transform skip enabled flag (e.g., sps_transform_skip_enabled_flag) is 1, or the value of the palette coding enabled flag (e.g., sps_palette_enabled_flag) is 1, the min_qp_prime_ts_minus4 syntax element may be parsed/signaled.

Further, as described above, the syntax elements related to the transform skip based coding and/or the palette mode based coding may be defined in the high-level syntax set, and as in an embodiment of Table 12 below, may be defined in the sequence parameter set (SPS). However, the maximum block size information for the transform skip that is defined in a picture parameter set (PPS) in the related art may be newly defined in the SPS to avoid dependency between HLSs, and this may be represented as in Table 12 below.

TABLE 12

|  | Descriptor |
| --- | --- |
| seq_parameter_set_rbsp( ) { | |
| (...) | |
| sps_transform_skip_enabled_flag | u(1) |
| if( sps_transform_skip_enabled_flag ) { | |
| sps_bdpcm_enabled_flag | u(1) |
| log2_transform_skip_max_size_minus2 | ue(v) |
| } | |
| (...) | |
| if( chroma_format_idc = = 3 ) | |
| sps_palette_enabled_flag | u(1) |
| (...) | |
| if( sps_transform_skip_enabled_flag \|\| sps_palette_enabled_flag ) | |
| min_qp_prime_ts_minus4 | ue(v) |
| (...) | |
| } | |

Further, for example, the semantic of a syntax element for the above-described embodiment among syntax elements of the SPS syntax may be represented as in Table 13 below.

TABLE 13 sps_transform_skip_enabled_flag equa to 1 specifies that transform_skip_flag may
be present in the transform unit syntax. sps_transform_skip_enabled_flag equal to 0
specifies that transform_skip_flag is not present in the transform unit syntax.
sps_bdpcm_enabled_flag equal to 1 specifies that intra_bdpcm_flag may be present
in the coding unit syntax for intra coding units. sps_bdpcm_enabled_flag equal to 0
specifies that intra_bdpcm_flag is not present in the coding unit syntax for intra
coding units. When not present, the value of sps_bdpcm_enabled_flag is inferred to
be equal to 0.
min_qp_prime_ts_minus4 specifies the minimum allowed quantization parameter
for transform skip mode as follows:
QpPrimeTsMin = 4 + min_qp_prime_ts_ minus4
log2_transform_skip_max_size_minus2 specifies the maximum block size used for
transform skip, and shall be in the range of 0 to 3.
When not present, the value of log2_transform_skip_max_size_minus2 is inferred to
be equal to 0.
The variable MaxTsSize is set equal to 1 <<
( log2_transform_skip_max_size_minus2 + 2 ).
sps_palette_enabled_flag equal to 1 specifies that pred_mode_plt_flag may be
present in the coding unit syntax. sps_palette_enabled_flag equal to 0 specifies that
pred_mode_plt_flag is not present in the coding unit syntax. When
sps_palette_enabled_flag is not present, it is inferred to be equal to 0.

Referring to Table 12 and Table 13 above, in the SPS, syntax elements related to the transform skip and/or the palette coding may be defined, and may include syntax elements of the sps_transform_skip_enabled_flag, the sps_bdpcm_enabled_flag, the log 2_transform_skip_max_size_minus2, the sps_palette_enabled_flag, and the min_qp_prime_ts_minus4.

Here, since the syntax elements of the sps_transform_skip_enabled_flag, the sps_bdpcm_enabled_flag, the log 2_transform_skip_max_size_minus2, the sps_palette_enabled_flag, and the min_qp_prime_ts_minus4 have been described in detail in Table 6 to Table 11 above, in the present embodiment, for convenience in explanation, the detailed explanation thereof will be omitted.

As disclosed in an embodiment of Table 12 and Table 13 above, in the SPS, syntax elements having dependency may be defined with respect to the transform skip enabled flag syntax element (e.g., sps_transform_skip_enabled_flag) among the syntax elements related to the transform skip and/or the palette coding. For example, as disclosed in Table 12 and Table 13 above, in the SPS, the sps_bdpcm_enabled_flag syntax element representing whether the BDPCM is enabled based on the value of the transform skip enabled flag (e.g., sps_transform_skip_enabled_flag), and the log 2_transform_skip_max_size_minus2 syntax element representing the maximum block size being used in the transform skip mode may have the dependency. As an example, if the value of the transform skip enabled flag (e.g., sps_transform_skip_enabled_flag) is 1, the syntax elements of the sps_bdpcm_enabled_flag and the log 2_transform_skip_max_size_minus2 may be parsed/signaled. Further, if the value of the transform skip enabled flag (e.g., sps_transform_skip_enabled_flag) is 0, the syntax elements of the sps_bdpcm_enabled_flag and the log 2_transform_skip_max_size_minus2 may not be parsed/signaled.

Further, in the SPS, syntax elements having dependency may be defined with respect to the transform skip enabled flag syntax element (e.g., sps_transform_skip_enabled_flag) and/or the palette coding enabled flag syntax element (e.g., sps_palette_enabled_flag) among the syntax elements related to the transform skip and/or the palette coding. For example, as disclosed in Table 12 and Table 13 above, the min_qp_prime_ts_minus4 syntax element representing the minimum quantization parameter information for the transform skip mode based on the values of the transform skip enabled flag (e.g., sps_transform_skip_enabled_flag) and/or the palette coding enabled flag syntax element (e.g., sps_palette_enabled_flag) may have the dependency in the SPS. As an example, in case that the value of the transform skip enabled flag (e.g., sps_transform_skip_enabled_flag) is 1, or the value of the palette coding enabled flag (e.g., sps_palette_enabled_flag) is 1, the min_qp_prime_ts_minus4 syntax element may be parsed/signaled.

Meanwhile, the source or the coded picture/image may include a luma component array, and in some cases, may further include two chroma components (cb, cr) array, That is, one pixel of the picture/image may include a luma sample and a chroma sample (cb, cr).

A color format may represent a configuration format of the luma component and the chroma component (cb, cr), and may be called a chroma format. The color format (or chroma format) may be predetermined, or may be adaptively signaled. For example, the chroma format may be signaled based on at least one of chroma_format_idc and separate_colour_plane_flag as in Table 14 below.

TABLE 14

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Referring to Table 14 above, in monochrome sampling, there is only one sample array that is nominally considered as a luma array.

In 4:2:0 sampling, each of two chroma arrays has a half height and a half width of the luma array.

In 4:2:2 sampling, each of two chroma arrays has the same height and a half width of the luma array.

In 4:4:4 sampling, the followings may be applied in accordance with the value of the separate_colour_plane_flag.

If the value of the separate_colour_plane_flag is 0, each of the two chroma arrays has the same height and the same width of the luma array.

Otherwise, if the value of the separate_colour_plane_flag is 1, three kinds of color planes may be separately processed as monochrome sampled pictures.

SubWidthC and SubHeightC may represent a ratio between the luma sample and the chroma sample. For example, if the chroma_format_idc is 3, the chroma format is 4:4:4, and in this case, in case that the width of the luma sample block is 16, the width of the corresponding chroma sample block may be 16/SubWidthC. In general, the chroma sample related syntax and bitstream may be parsed only in case that the chroma array type (e.g., chromaArrayType) is not 0.

Further, as an embodiment, the present document proposes a method for saving bits being transmitted by enabling the syntax element having dependency to determine whether to perform parsing/signaling in accordance with the dependent condition with respect to the transform skip related high-level syntax element and the palette coding related high-level syntax element. As an example, a method for parsing the high-level syntax element having dependency by the transform skip (enabled) flag and the palette coding (enabled) flag is proposed.

For example, as syntax elements dependent on the transform skip based coding, there are a transform skip (enabled) flag (e.g., sps_transform_skip_enabled_flag), information on the size of the transform skip application (e.g., log 2_transform_skip_max_size_minus2), minimum quantization parameter information during the transform skip (e.g., min_qp_prime_ts_minus4), and information on whether to apply the BDPCM (e.g., sps_bdpcm_enabled_flag). Further, as described above, since the escape value is also not changed during the palette coding, the minimum quantization parameter information for the transform skip may be used in performing the quantization.

As being represented in the above-described embodiment, if the value of the transform skip (enabled) flag or the palette coding (enabled) flag is defined as 1, the related flag or the information syntax elements should be necessarily transmitted, whereas if the value of the transform skip (enabled) flag or the palette coding (enabled) flag is defined as 0, the syntax elements excluding the respective flag syntax elements may not be transmitted. That is, a method for transmitting a high-level syntax element is proposed, which is dependent on whether to perform the transform skip, such as the minimum quantization parameter information during the transform skip or the palette coding and whether to apply the BDPCM, in accordance with the value of the transform skip (enabled) flag and the palette coding (enabled) flag, or whether to perform the palette coding in the high-level syntax (e.g., VPS, SPS, PPS, APS, DPS, and slice header).

For example, (i) In case that both the transform skip (enabled) flag and the palette coding (enabled) flag are defined as 1, syntax elements corresponding to a union of syntax elements dependent on the transform skip (enabled) flag and the palette coding (enabled) flag may be parsed. (ii) In case that the transform skip (enabled) flag is defined as 1, and the palette coding (enabled) flag is 0, the syntax elements dependent on the transform skip (enabled) flag may be parsed. (iii) In case that the transform skip (enabled) flag is defined as 0, and the palette coding (enabled) flag is 1, the syntax elements dependent on the palette coding (enabled) flag may be parsed. (iv) In case that both the transform skip (enabled) flag and the palette coding (enabled) flag are 0, other high-level syntax elements having dependency on two coding tools may not be parsed.

The parsing order of the syntax elements mentioned in the present embodiment is not specifically limited, and in case that whether to perform parsing is determined according to the dependency between the syntax elements, they are considered to coincide with each other. Further, the proposed method is not limited to the syntax elements mentioned in the present embodiment, but may have dependency depending on whether the transform skip or the palette coding is performed, and may include all high-level syntax elements defined in the high-level syntax set including the transform skip (enabled) flag and the palette coding (enabled) flag.

As described above, the syntax elements related to the transform skip based coding and/or the palette mode based coding may be defined in the high-level syntax set, and may be defined in the sequence parameter set (SPS) as in an embodiment of Table 15 below.

TABLE 15

| | Descriptor |
|---|---|
| seq_parameter_set_rbsp( ) { | |
| (...) | |
| sps_transform_skip_enabled_flag | u(1) |
| if( sps_transform_skip_enabled_flag ) | |
| sps_bdpcm_enabled_flag | u(1) |
| (...) | |
| if( chroma_format_idc = = 3 ) | |
| sps_palette_enabled_flag | u(1) |
| (...) | |
| if( sps_palette_enabled_flag ) | |
| min_qp_prime_ts_chroma_minus4 | ue(v) |
| (...) | |
| if( sps_transform_skip_enabled_flag \|\| sps_palette_enabled_flag ) | |
| min_qp_prime_ts_luma_minus4 | ue(v) |
| (...) | |
| } | |

Further, for example, the semantic of the syntax element for the above-described embodiment among the syntax elements of the SPS syntax may be represented as in Table 16 below.

TABLE 16 sps_transform_skip_enabled_flag equa to 1 specifies that transform_skip_flag may be present in the transform unit syntax. sps_transform_skip_enabled_flag equal to 0 specifies that transform_skip_flag is not present in the transform unit syntax.

sps_bdpcm_enabled_flag equal to 1 specifies that intra_bdpcm_flag may be present in the coding unit syntax for intra coding units. sps_bdpcm_enabled_flag equal to 0 specifies that intra_bdpcm_flag is not present in the coding unit syntax for intra coding units. When not present, the value of sps_bdpcm_enabled_flag is inferred to be equal to 0.

min_qp_prime_ts_luma_minus4 specifies the minimum allowed quantization parameter for transform skip mode in the luma component as follows:

QpPrimeTsMin = 4 + min_qp_prime_ts_luma_minus4 min_qp_prime_ts_chroma_minus4 specifies the minimum allowed quantization parameter for transform skip mode in the chroma component as follows:

QpPrimeTsMin = 4 + min_qp_prime_ts_ chroma_minus4 sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

Referring to Table 15 and Table 16 above, in the SPS, syntax elements related to the transform skip and/or the palette coding may be defined, and may include syntax elements of the sps_transform_skip_enabled_flag, sps_bdpcm_enabled_flag, sps_palette_enabled_flag, min_qp_prime_ts_luma_minus4, and min_qp_prime_ts_chroma_minus4.

Here, since the syntax elements of the sps_transform_skip_enabled_flag, sps_bdpcm_enabled_flag, and sps_palette_enabled_flag have been explained in detail in Table 6 to Table 11 above, in the present embodiment, for convenience in explanation, the detailed explanation thereof will be omitted.

As disclosed in an embodiment of Table 15 and Table 16 above, in the SPS, syntax elements having dependency may be defined with respect to the transform skip enabled flag syntax element (e.g., sps_transform_skip_enabled_flag) among the syntax elements related to the transform skip and/or the palette coding. For example, as disclosed in Table 15 and Table 16 above, in the SPS, the sps_bdpcm_enabled_flag syntax element representing whether the BDPCM is enabled based on the value of the transform skip enabled flag (e.g., sps_transform_skip_enabled_flag) may have the dependency. As an example, if the value of the transform skip enabled flag (e.g., sps_transform_skip_enabled_flag) is 1, the sps_bdpcm_enabled_flag syntax element may be parsed/signaled. Further, if the value of the transform skip enabled flag (e.g., sps_transform_skip_enabled_flag) is 0, the sps_bdpcm_enabled_flag syntax element may not be parsed/signaled.

Further, in the SPS, syntax elements having dependency may be defined with respect to the palette coding enabled flag syntax element (e.g., sps_palette_enabled_flag) among the syntax elements related to the transform skip and/or the palette coding. For example, as disclosed in Table 15 and Table 16 above, the min_qp_prime_ts_chroma_minus4 syntax element representing the minimum quantization parameter information in the transform skip mode for the chroma component based on the value of the palette coding enabled flag (e.g., sps_palette_enabled_flag) may have the dependency in the SPS. As an example, if the value of the palette coding enabled flag (e.g., sps_palette_enabled_flag) is 1, the min_qp_prime_ts_chroma_minus4 syntax element may be parsed/signaled. Further, if the value of the palette coding enabled flag (e.g., sps_palette_enabled_flag) is 0, the min_qp_prime_ts_chroma_minus4 syntax element may not be parsed/signaled.

Further, in the SPS, syntax elements having dependency may be defined with respect to the transform skip enabled flag syntax element (e.g., sps_transform_skip_enabled_flag) and/or the palette coding enabled flag syntax element (e.g., sps_palette_enabled_flag) among the syntax elements related to the transform skip and/or the palette coding. For example, as disclosed in Table 15 and Table 16 above, the min_qp_prime_ts_luma_minus4 syntax element representing the minimum quantization parameter information in the transform skip mode for the luma component based on the value of the transform skip enabled flag (e.g., sps_transform_skip_enabled_flag) and/or the palette coding enabled flag syntax element (e.g., sps_palette_enabled_flag) may have the dependency in the SPS. As an example, if the value of the transform skip enabled flag (e.g., sps_transform_skip_enabled_flag) is 1, or the value of the palette coding enabled flag (e.g., sps_palette_enabled_flag) is 1, the min_qp_prime_ts_luma_minus4 syntax element may be parsed/signaled.

Further, as an embodiment, the present document proposes a method for saving bits being transmitted by enabling the syntax element having dependency to determine whether to perform parsing/signaling in accordance with the dependent condition with respect to the transform skip related high-level syntax element and the palette coding related high-level syntax element. As an example, a method for parsing the high-level syntax element having dependency by the transform skip (enabled) flag and the palette coding (enabled) flag is proposed.

For example, as syntax elements dependent on the transform skip based coding, there are a transform skip (enabled) flag (e.g., sps_transform_skip_enabled_flag), information on the size of the transform skip application (e.g., log2_transform_skip_max_size_minus2), minimum quantization parameter information during the transform skip (e.g., min_qp_prime_ts_minus4), and information on whether to apply the BDPCM (e.g., sps_bdpcm_enabled_flag). Further, as described above, since the escape value is also not changed during the palette coding, the minimum quantization parameter information for the transform skip may be used in performing the quantization.

As being represented in the above-described embodiment, if the value of the transform skip (enabled) flag or the palette coding (enabled) flag is defined as 1, the related flag or the information syntax elements should be necessarily transmitted, whereas if the value of the transform skip (enabled) flag or the palette coding (enabled) flag is defined as 0, the syntax elements excluding the respective flag syntax elements may not be transmitted. That is, a method for transmitting a high-level syntax element is proposed, which is dependent on whether to perform the transform skip, such as information on the maximum size of transform skip application, the minimum quantization parameter information during the transform skip or the palette coding, and whether to apply the BDPCM, in accordance with the value of the transform skip (enabled) flag and the palette coding (enabled) flag, or whether to perform the palette coding in the high-level syntax (e.g., VPS, SPS, PPS, APS, DPS, and slice header).

For example, (i) In case that both the transform skip (enabled) flag and the palette coding (enabled) flag are defined as 1, syntax elements corresponding to a union of syntax elements dependent on the transform skip (enabled) flag and the palette coding (enabled) flag may be parsed. (ii) In case that the transform skip (enabled) flag is defined as 1, and the palette coding (enabled) flag is 0, the syntax elements dependent on the transform skip (enabled) flag may be parsed. (iii) In case that the transform skip (enabled) flag is defined as 0, and the palette coding (enabled) flag is 1, the syntax elements dependent on the palette coding (enabled) flag may be parsed. (iv) In case that both the transform skip (enabled) flag and the palette coding (enabled) flag are 0, other high-level syntax elements having dependency on two coding tools may not be parsed.

The parsing order of the syntax elements mentioned in the present embodiment is not specifically limited, and in case that whether to perform parsing is determined according to the dependency between the syntax elements, they are considered to coincide with each other. Further, the proposed method is not limited to the syntax elements mentioned in the present embodiment, but may have dependency depending on whether the transform skip or the palette coding is performed, and may include all high-level syntax elements defined in the high-level syntax set including the transform skip (enabled) flag and the palette coding (enabled) flag.

As described above, the syntax elements related to the transform skip based coding and/or the palette mode based coding may be defined in the high-level syntax set, and may be defined in the sequence parameter set (SPS) as in an embodiment of Table 17 below. In the present embodiment, information on the maximum size of the transform skip defined in the picture parameter set (PPS) in the related art may be newly defined in the SPS to avoid the dependency between the HLSs, and a method for performing parsing/signaling based on the dependency of the transform skip and palette coding related syntax element being previously used is proposed.

TABLE 17

|  | Descriptor |
|---|---|
| seq_parameter_set_rbsp( ) { | |
| (...) | |
| sps_transform_skip_enabled_flag | u(1) |
| if( sps_transform_skip_enabled_flag ) { | |
| sps_bdpcm_enabled_flag | u(1) |
| log2_transform_skip_max_size_minus2 | ue(v) |
| } | |
| (...) | |
| if( chroma_format_idc = = 3 ) | |
| sps_palette_enabled_flag | u(1) |
| (...) | |
| if( sps_palette_enabled_flag ) | |
| min_qp_prime_ts_chroma_minus4 | ue(v) |
| (...) | |
| if( sps_transform_skip_enabled_flag \|\| sps_palette_enabled_flag ) | |
| min_qp_prime_ts_luma_minus4 | ue(v) |
| (...) | |
| } | |

Further, for example, the semantic of the syntax element for the above-described embodiment among the syntax elements of the SPS syntax may be represented as in Table 18 below.

TABLE 18 sps_transform_skip_enabled_flag equa to 1 specifies that transform_skip_flag may be present in the transform unit syntax. sps_transform_skip_enabled_flag equal to 0 specifies that transform_skip_flag is not present in the transform unit syntax.
sps_bdpcm_enabled_flag equal to 1 specifies that intra_bdpcm_flag may be present in the coding unit syntax for intra coding units. sps_bdpcm_enabled_flag equal to 0 specifies that intra_bdpcm_flag is not present in the coding unit syntax for intra coding units. When not present, the value of sps_bdpcm_enabled_flag is inferred to be equal to 0.
log2_transform_skip_max_size_minus2 specifies the maximum block size used for transform skip, and shall be in the range of 0 to 3.
When not present, the value of log2_transform_skip_max_size_minus2 is inferred to be equal to 0.
The variable MaxTsSize is set equal to 1 <<
( log2_transform_skip_max_size_minus2 + 2 ).
min_qp_prime_ts_luma_minus4 specifies the minimum allowed quantization parameter for transform skip mode in the luma component as follows:
QpPrimeTsMin = 4 + min_qp_prime_ts_luma_minus4
min_qp_prime_ts_chroma_minus4 specifies the minimum allowed quantization parameter for transform skip mode in the chroma component as follows:
QpPrimeTsMin = 4 + min_qp_prime_ts_chroma_minus4
sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

Referring to Table 17 and Table 18 above, in the SPS, syntax elements related to the transform skip and/or the palette coding may be defined, and may include syntax elements of the sps_transform_skip_enabled_flag, sps_bdpcm_enabled_flag, log 2_transform_skip_max_size_minus2, sps_palette_enabled_flag, min_qp_prime_ts_luma_minus4, and min_qp_prime_ts_chroma_minus4.

Here, since the syntax elements of the sps_transform_skip_enabled_flag, sps_bdpcm_enabled_flag, log 2_transform_skip_max_size_minus2, sps_palette_enabled_flag, min_qp_prime_ts_luma_minus4, and min_qp_prime_ts_chroma_minus4 have been explained in detail in Table 6 to Table 11 above, in the present embodiment, for convenience in explanation, the detailed explanation thereof will be omitted.

As disclosed in an embodiment of Table 17 and Table 18 above, in the SPS, syntax elements having dependency may be defined with respect to the transform skip enabled flag syntax element (e.g., sps_transform_skip_enabled_flag) among the syntax elements related to the transform skip and/or the palette coding. For example, as disclosed in Table 17 and Table 18 above, in the SPS, the sps_bdpcm_enabled_flag syntax element representing whether the BDPCM is enabled based on the value of the transform skip enabled flag (e.g., sps_transform_skip_enabled_flag) and the log 2_transform_skip_max_size_minus2 syntax element representing the maximum block size being used in the transform skip mode may have the dependency. As an example, if the value of the transform skip enabled flag (e.g., sps_transform_skip_enabled_flag) is 1, the syntax elements of the sps_bdpcm_enabled_flag and the log 2_transform_skip_max_size_minus2 may be parsed/signaled. Further, if the value of the transform skip enabled flag (e.g., sps_transform_skip_enabled_flag) is 0, the syntax elements of the sps_bdpcm_enabled_flag and the log 2_transform_skip_max_size_minus2 may not be parsed/signaled.

Further, in the SPS, syntax elements having dependency may be defined with respect to the palette coding enabled flag syntax element (e.g., sps_palette_enabled_flag) among the syntax elements related to the transform skip and/or the palette coding. For example, as disclosed in Table 17 and Table 18 above, the min_qp_prime_ts_chroma_minus4 syntax element representing the minimum quantization parameter information in the transform skip mode for the chroma component based on the value of the palette coding enabled flag (e.g., sps_palette_enabled_flag) may have the dependency in the SPS. As an example, if the value of the palette coding enabled flag (e.g., sps_palette_enabled_flag) is 1, the min_qp_prime_ts_chroma_minus4 syntax element may be parsed/signaled. Further, if the value of the palette coding enabled flag (e.g., sps_palette_enabled_flag) is 0, the min_qp_prime_ts_chroma_minus4 syntax element may not be parsed/signaled.

Further, in the SPS, syntax elements having dependency may be defined with respect to the transform skip enabled flag syntax element (e.g., sps_transform_skip_enabled_flag) and/or the palette coding enabled flag syntax element (e.g., sps_palette_enabled_flag) among the syntax elements related to the transform skip and/or the palette coding. For example, as disclosed in Table 17 and Table 18 above, the min_qp_prime_ts_luma_minus4 syntax element representing the minimum quantization parameter information in the transform skip mode for the luma component based on the value of the transform skip enabled flag (e.g., sps_transform_skip_enabled_flag) and/or the palette coding enabled flag syntax element (e.g., sps_palette_enabled_flag) may have the dependency in the SPS. As an example, if the value of the transform skip enabled flag (e.g., sps_transform_skip_enabled_flag) is 1, or the value of the palette coding enabled flag (e.g., sps_palette_enabled_flag) is 1, the min_qp_prime_ts_luma_minus4 syntax element may be parsed/signaled.

The following drawing has been prepared to explain a detailed example of the present document. Since the name of a detailed device or a detailed term or name (e.g., syntax/ name of syntax element) described in the drawing is exemplarily presented, the technical features of the present document are not limited to the detailed name used in the drawing.

Figure 11:
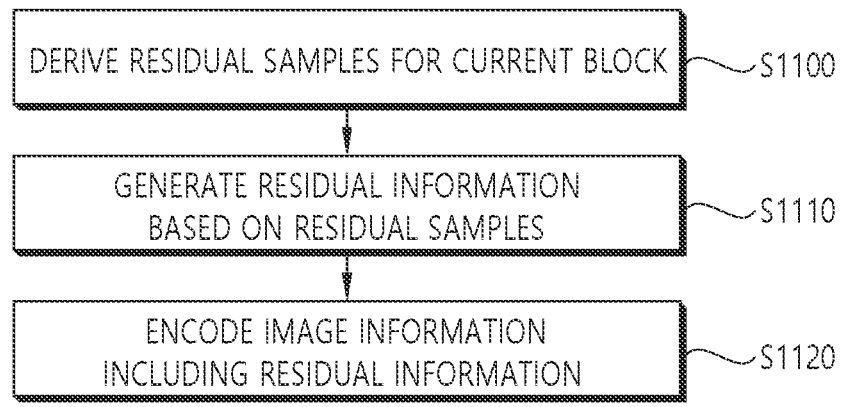
FIGS. 11 and 12 schematically illustrate a video/image encoding method and an example of related components according to embodiment(s) of the present document.
Figure 12:
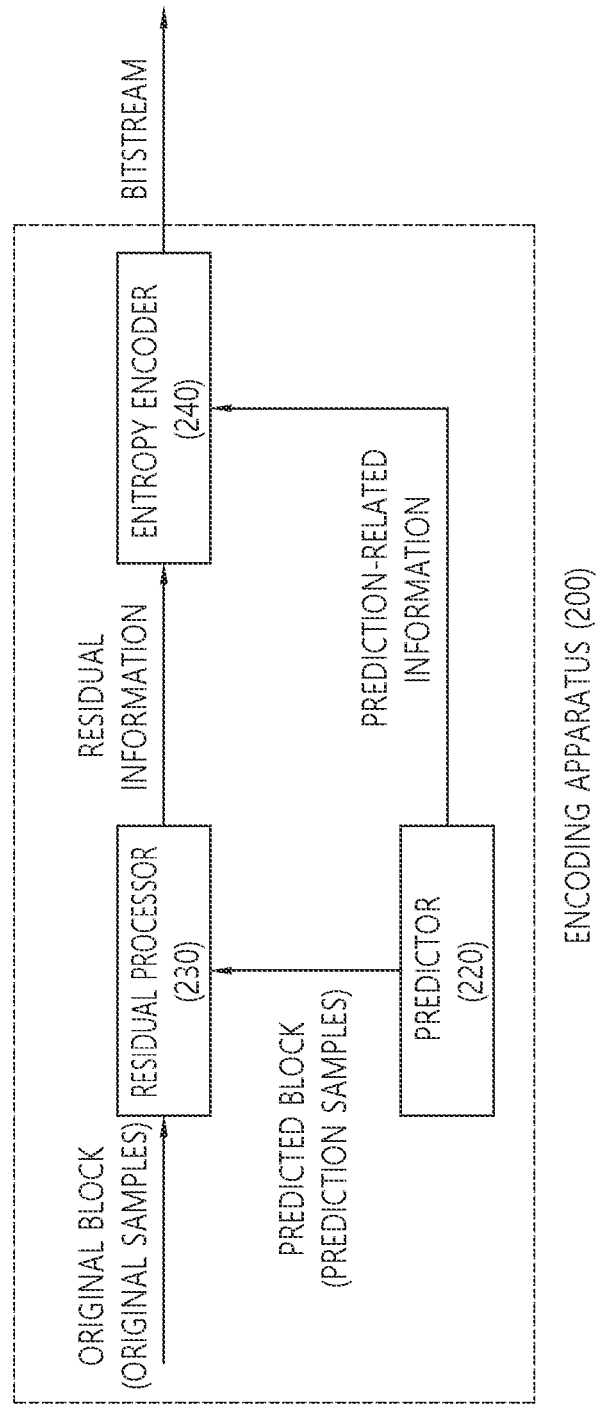

FIGS. 11 and 12 schematically illustrate a video/image encoding method and an example of related components according to embodiment(s) of the present document.

The method disclosed in FIG. 11 may be performed by the encoding apparatus 200 disclosed in FIG. 2 or FIG. 12. Here, the encoding apparatus 200 disclosed in FIG. 12 briefly represents the encoding apparatus 200 disclosed in FIG. 2. Specifically, steps S1100 to S1110 of FIG. 11 may be performed by the residual processor 230 disclosed in FIG. 2, and step S1120 of FIG. 11 may be performed by the entropy encoder 240 disclosed in FIG. 2. Further, although not illustrated, a process of deriving a prediction sample may be performed by the predictor 220 of the encoding apparatus 200, and a process of generating a reconstructed sample and a reconstructed picture for the current block based on a residual sample and a prediction sample for the current block may be performed by the adder 250 of the encoding apparatus 200, and a process of encoding prediction information for the current block may be performed by the entropy encoder 240 of the encoding apparatus 200. Further, the method disclosed in FIG. 11 may include the above-described embodiments to be performed. Accordingly, referring to FIG. 11, the detailed explanation of the duplicate contents of the above-described embodiments will be omitted or simplified.

Referring to FIG. 11, the encoding apparatus may derive a residual sample for the current block (S1100).

As an embodiment, the encoding apparatus may first determine the prediction mode for the current block, and may derive prediction samples. For example, the encoding apparatus may determine whether to perform inter prediction or intra prediction with respect to the current block, and may also determine a specific inter prediction mode or a specific intra prediction mode based on an RD cost. Further, the encoding apparatus may determine whether to perform the prediction with respect to the current block based on a CIIP mode, an IBC mode, a BDPCM mode, or a palette mode. The encoding apparatus may derive the prediction samples for the current block by performing the prediction in accordance with the determined prediction mode. In this case, various prediction methods disclosed in the present document, such as inter prediction or intra prediction, may be applied. Further, the encoding apparatus may generate and encode information (e.g., prediction mode information) related to the prediction applied to the current block.

Further, the encoding apparatus may derive the residual samples by comparing the prediction samples with the original samples for the current block with each other. The encoding apparatus may derive transform coefficients through a transform process for the residual samples. In this case, the encoding apparatus may determine whether to apply the transform to the current block in consideration of the coding efficiency. That is, the encoding apparatus may determine whether the transform is applied to the residual samples of the current block.

For example, the encoding apparatus may determine whether to apply the transform or the transform skip mode to the current block (residual samples) based on transform skip enabled information.

As described above, the transform skip enabled information may be information on whether the transform skip is enabled, and as disclosed in Table 6 to Table 18, it may be represented as an sps_transform_skip_enabled_flag syntax element.

For example, if the value of the sps_transform_skip_enabled_flag is 1, it may represent that the transform skip is enabled, and in this case, the transform_skip_flag may be parsed/signaled through the transform unit syntax. Here, the transform_skip_flag syntax element may represent whether a transform can be applied to the associated transform block. If the value of the sps_transform_skip_enabled_flag is 0, it may represent that the transform skip is not enabled, and in this case, the transform_skip_flag may not be parsed/signaled in the transform unit syntax. The transform skip enabled information (e.g., sps_transform_skip_enabled_flag) may be included in the SPS, and may be signaled to the decoding apparatus. That is, based on that the value of the transform skip enabled information (e.g., sps_transform_skip_enabled_flag) included in the SPS is 1, the transform unit syntax may include the transform skip flag (e.g., transform_skip_flag). In this case, if the value of the transform skip flag (e.g., transform_skip_flag) included in the transform unit syntax is 1, a mode in which the transform is not applied (transform skip mode) may be performed for the current block. Further, if the value of the transform skip flag (e.g., transform_skip_flag) included in the transform unit syntax is 0, the transform may be applied for the current block.

For example, if the value of the transform skip enabled information is 1 (i.e., with respect to the transform skip enabled information representing that the transform skip is enabled), the encoding apparatus may determine whether to apply the transform to the current block. That is, the encoding apparatus may generate information (transform_skip_flag) on whether to apply the transform to the current block based on that the value of the transform skip enabled information is 1, and may signal the transform_skip_flag through the transform unit syntax. In this case, if the transform is not applied to the current block (i.e., in case of the transform skip mode), the encoding apparatus may generate a transform_skip_flag of which the value is 1, and may include this in the transform unit syntax. Further, in case of applying the transform to the current block, the encoding apparatus may generate the transform_skip_flag of which the value is 0, and may include this in the transform unit syntax.

The encoding apparatus may generate residual information based on a residual sample (S1110).

As an embodiment, the encoding apparatus may derive residual samples of the current block, and may generate residual information by applying the transform or transform skip to the residual samples of the current block based on whether to apply the transform. For example, with respect to the residual samples for the current block of which the transform skip flag value is 1, the encoding apparatus may apply the transform skip mode. In this case, the encoding apparatus may derive the residual samples of the current block as transform coefficients. Further, with respect to the residual samples for the current block of which the transform skip flag value is 0, the encoding apparatus may derive the transform coefficients by performing the transform. The encoding apparatus may derive quantized transform coefficients by performing a quantization process based on the transform coefficients derived through the transform skip or the transform. The encoding apparatus may generate the residual information based on the quantized transform coefficients.

Here, the residual information may be information generated through the transform and/or quantization process, and may be information about the quantized transform coefficients, and for example, may include information on value information of the quantized transform coefficients, position information, transform technique, transform kernel, and quantization parameter.

The encoding apparatus may encode image information (or video information) (S1120).

Here, the image information may include the residual information. Further, the image information may include information (e.g., prediction mode information) related to the prediction used to derive the prediction samples. Further, the image information may include information related to the transform skip, for example, transform skip enabled information, transform skip flag information, and information on the maximum block size used in the transform skip mode. Further, the image information may include information related to palette coding (e.g., palette enabled information), BDPCM-related information (e.g., BDPCM enabled information, and BDPCM flag), and the like. Further, the image information may include information related to the transform skip and/or pallet coding, for example, information on the minimum allowed quantization parameter for the transform skip mode. That is, the image information may include various kinds of information derived in the encoding process, and may be encoded with such various kinds of information.

Further, the image information may include various kinds of information according to the above-described embodiment(s) in the present document, and may include information disclosed in at least one of Tables 1 to 18 as described above.

For example, the image information may include a sequence parameter set (SPS). The SPS may include transform skip related information and palette coding related information. As an example, the transform skip related information may include transform skip enabled information (e.g., sps_transform_skip_enabled_flag), BDPCM enabled information (e.g., sps_bdpcm_enabled_flag), information on the maximum block size used in the transform skip mode (e.g., log 2_transform_skip_max_size_minus2), and the minimum quantization parameter information related to the minimum allowed quantization parameter for the transform skip mode (e.g., min_qp_prime_ts_minus4). Further, as an example, the palette coding related information may include palette coding enabled information (e.g., sps_palette_enabled_flag) and the minimum quantization parameter information related to the minimum allowed quantization parameter for the transform skip mode (e.g., min_qp_prime_ts_minus4).

Further, for example, as described above, among the information related to the transform skip and/or the palette coding included in the SPS, information having dependency may be defined with respect to the transform skip enabled information (e.g., sps_transform_skip_enabled_flag).

As an example, the SPS may be configured to parse/signal BDPCM enabled information (e.g., sps_bdpcm_enabled_flag) on whether to enable the BDPCM based on the value of the transform skip enabled information (e.g., sps_transform_skip_enabled_flag). In this case, if the value of the transform skip enabled information (e.g., sps_transform_skip_enabled_flag) is 1, the BDPCM enabled information (e.g., sps_bdpcm_enabled_flag) may be included in the SPS, and the BDPCM enabled information (e.g., sps_bdpcm_enabled_flag) may be parsed/signaled from the SPS. Further, if the value of the transform skip enabled information (e.g., sps_transform_skip_enabled_flag) is 0, the BDPCM enabled information (e.g., sps_bdpcm_enabled_flag) may not be parsed/signaled from the SPS.

Further, based on the value of the BDPCM enabled information (e.g., sps_bdpcm_enabled_flag) in the SPS, the BDPCM flag information (e.g., intra_bdpcm_flag) on whether to apply the BDPCM to the current block) may be parsed/signaled through the coding unit syntax. In this case, if the value of the BDPCM enabled information (e.g., sps_bdpcm_enabled_flag) is 1, the BDPCM flag information (e.g., intra_bdpcm_flag) may be included in the coding unit syntax, and the BDPCM flag information (e.g., intra_bdpcm_flag) may be parsed/signaled from the coding unit syntax. Further, if the value of the BDPCM enabled information (e.g., sps_bdpcm_enabled_flag) is 0, the BDPCM flag information (e.g., intra_bdpcm_flag) may not be parsed/signaled from the coding unit syntax.

Further, as an example, the SPS may be configured to parse/signal information on the maximum block size (e.g., log 2_transform_skip_max_size_minus2) used in the transform skip mode based on the value of the transform skip enabled information (e.g., sps_transform_skip_enabled_flag). In this case, if the value of the transform skip enabled information (e.g., sps_transform_skip_enabled_flag) is 1, the information on the maximum block size (e.g., log 2_transform_skip_max_size_minus2) used in the transform skip mode may be included in the SPS, and the information (e.g., log 2_transform_skip_max_size_minus2) may be parsed/signaled from the SPS. Further, if the value of the transform skip enabled information (e.g., sps_transform_skip_enabled_flag) is 0, the information on the maximum block size (e.g., log 2_transform_skip_max_size_minus2) used in the transform skip mode may not be parsed/signaled from the SPS.

Further, as an example, based on the value of the transform skip enabled information (e.g., sps_transform_skip_enabled_flag) defined in the SPS, transform_skip_flag information (e.g., transform_skip_flag) on whether to apply the transform skip to the current block may be parsed/signaled through the transform unit syntax. In this case, if the value of the transform skip enabled information (e.g., sps_transform_skip_enabled_flag) is 1, the transform_skip_flag information (e.g., transform_skip_flag) may be included in the transform unit syntax, and the transform_skip_flag information (e.g., transform_skip_flag) may be parsed/signaled from the transform unit syntax. Further, if the value of the transform skip enabled information (e.g., sps_transform_skip_enabled_flag) is 0, the transform_skip_flag information (e.g., transform_skip_flag) may not be parsed/signaled from the transform unit syntax.

Further, for example, among the information related to the transform skip and/or the palette coding included in the SPS as described above, information having dependency may be defined with respect to the palette coding enabled information on whether the palette coding is enabled (e.g., sps_palette_enabled_flag). As an example, based on the value of the palette coding enabled information (e.g., sps_palette_enabled_flag) defined in the SPS, palette prediction mode flag information (e.g., pred_mode_plt_flag) on whether to apply the palette coding (palette prediction mode) to the current block may be parsed/signaled through the coding unit syntax. In this case, if the value of the palette coding enabled information (e.g., sps_palette_enabled_flag) is 1, the palette prediction mode flag information (e.g., pred_mode_plt_flag) may be included in the coding unit syntax, and the information (e.g., pred_mode_plt_flag) may be parsed/signaled from the coding unit syntax. Further, if the value of the palette coding enabled information (e.g., sps_palette_enabled_flag) is 0, the palette prediction mode flag information (e.g., pred_mode_plt_flag) may not be parsed/signaled from the coding unit syntax.

Further, for example, as described above, among the information related to the transform skip and/or the palette coding included in the SPS, information having dependency may be defined with respect to the transform skip enabled information (e.g., sps_transform_skip_enabled_flag) and/or the palette coding enabled information (e.g., sps_palette_enabled_flag).

As an example, in the SPS, based on at least one of the transform skip enabled information (e.g., sps_transform_skip_enabled_flag) and/or the palette coding enabled information (e.g., sps_palette_enabled_flag), the minimum quantization parameter information (e.g., min_qp_prime_ts_minus4) related to the minimum allowed quantization parameter for the transform skip mode may be parsed/signaled. In other words, based on the condition that the value of the transform skip enabled information (e.g., sps_transform_skip_enabled_flag) is 1, or the value of the palette coding enabled information (e.g., sps_palette_enabled_flag) is 1, the minimum quantization parameter information (e.g., min_qp_prime_ts_minus4) may be included in the SPS, and only in case that the above condition is satisfied, the minimum quantization parameter information (e.g., min_qp_prime_ts_minus4) may be parsed/signaled.

Here, as described above, the minimum quantization parameter information (e.g., min_qp_prime_ts_minus4) may be information related to the minimum allowed quantization parameter for the transform skip mode, and based on this, the quantization parameter for the current block may be derived.

For example, in case that the transform skip mode is applied to the current block, the quantization parameter for the current block may be derived based on the minimum quantization parameter information (e.g., min_qp_prime_ts_minus4), and the quantized transform coefficients may be derived by performing the quantization process based on the quantization parameter.

Further, for example, in case that the palette coding mode is applied to the current block, the quantization parameter for an escape value of the current block may be derived based on the minimum quantization parameter information (e.g., min_qp_prime_ts_minus4). In this case, the quantized escape value (e.g., palette_escape_val) may be derived by applying the quantization parameter to the escape value of the current block based on the quantization parameter. The process in which the palette coding mode is applied may be performed as disclosed in Table 4 and Table 5 above.

As described above, the image information including various kinds of information may be encoded and output in the form of a bitstream. The bitstream may be transmitted to the decoding apparatus through a network or a (digital) storage medium. Here, the network may include a broadcasting network and/or a communication network, and the digital storage medium may include various storage media, such as USB, SD, CD, DVD, Blu-ray, HDD, and SSD.

Figure 13:
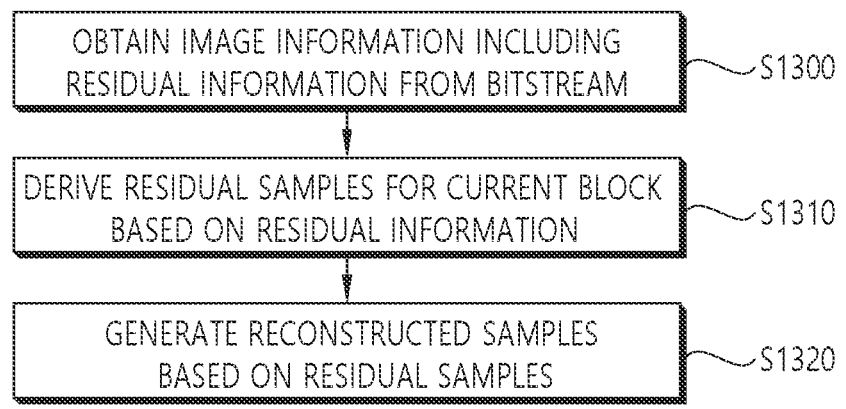
FIGS. 13 and 14 schematically illustrate a video/image decoding method and an example of related components according to embodiment(s) of the present document.
Figure 14:
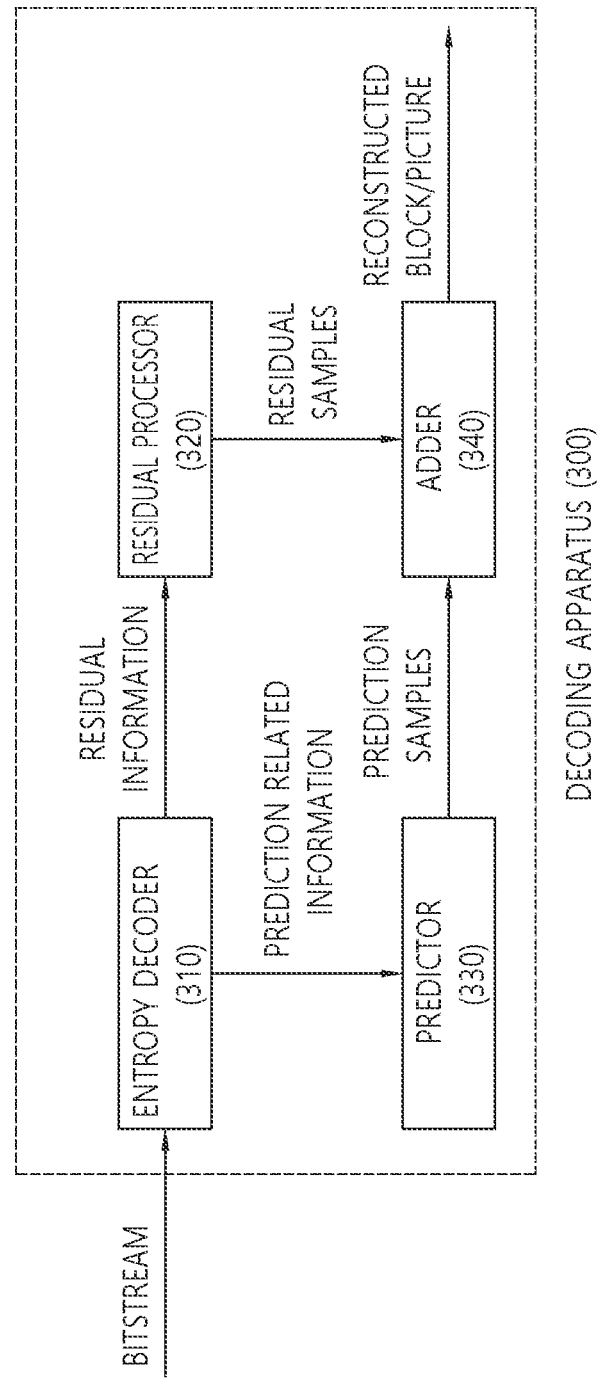

FIGS. 13 and 14 schematically illustrate a video/image decoding method and an example of related components according to embodiment(s) of the present document.

The method disclosed in FIG. 13 may be performed by the decoding apparatus 300 disclosed in FIG. 3 or FIG. 14. Here, the decoding apparatus 300 disclosed in FIG. 14 briefly represents the decoding apparatus 300 disclosed in FIG. 3. Specifically, step S1300 of FIG. 13 may be performed by the entropy decoder 310 disclosed in FIG. 3, step S1310 of FIG. 13 may be performed by the residual processor 320 disclosed in FIG. 3, and step S1320 of FIG. 13 may be performed by the adder 340 disclosed in FIG. 3. Further, although not illustrated, a process of receiving prediction information for the current block may be performed by the entropy decoder 310 of the decoding apparatus 300, and a process of deriving a prediction sample of the current block may be performed by the predictor 330 of the decoding apparatus 300. Further, the method disclosed in FIG. 13 may include the above-described embodiments of the present document to be performed. Accordingly, referring to FIG. 13, the detailed explanation of the duplicate contents of the above-described embodiments will be omitted or simplified.

Referring to FIG. 13, the decoding apparatus may receive image information (or video information) from a bitstream (S1300).

As an embodiment, the decoding apparatus may derive information (e.g., video/image information) necessary for image reconstruction (or picture reconstruction) by parsing the bitstream. In this case, the image information may include residual information, and the residual information may include value information of quantized transform coefficients, location information, transform technique, transform kernel, and quantized parameter information. Further, the image information may include prediction-related information (e.g., prediction mode information). Further, the image information may include information related to the transform skip, for example, transform skip enabled information, transform skip flag information, and information on the maximum block size used in the transform skip mode. Further, the image information may include information related to palette coding (e.g., palette enabled information), BDPCM-related information (e.g., BDPCM enabled information, and BDPCM flag), and the like. Further, the image information may include information related to the transform skip and/or pallet coding, for example, information on the minimum allowed quantization parameter for the transform skip mode. That is, the image information may include various kinds of information necessary in the decoding process, and may be decoded based on a coding method, such as exponential Golomb coding, CAVLC, or CABAC.

Further, the image information may include various kinds of information according to the above-described embodiments of the present document, and may include information disclosed in at least one of Tables 1 to 18 as described above.

For example, the image information may include a sequence parameter set (SPS). The SPS may include transform skip related information and palette coding related information. As an example, the transform skip related information may include transform skip enabled information (e.g., sps_transform_skip_enabled_flag), BDPCM enabled information (e.g., sps_bdpcm_enabled_flag), information on the maximum block size used in the transform skip mode (e.g., log 2_transform_skip_max_size_minus2), and the minimum quantization parameter information related to the minimum allowed quantization parameter for the transform skip mode (e.g., min_qp_prime_ts_minus4). Further, as an example, the palette coding related information may include palette coding enabled information (e.g., sps_palette_enabled_flag) and the minimum quantization parameter information related to the minimum allowed quantization parameter for the transform skip mode (e.g., min_qp_prime_ts_minus4).

Further, for example, as described above, among the information related to the transform skip and/or the palette coding included in the SPS, information having dependency may be defined with respect to the transform skip enabled information (e.g., sps_transform_skip_enabled_flag).

As an example, the SPS may be configured to parse/signal BDPCM enabled information (e.g., sps_bdpcm_enabled_flag) on whether to enable the BDPCM based on the value of the transform skip enabled information (e.g., sps_transform_skip_enabled_flag). In this case, if the value of the transform skip enabled information (e.g., sps_transform_skip_enabled_flag) is 1, the BDPCM enabled information (e.g., sps_bdpcm_enabled_flag) may be included in the SPS, and the BDPCM enabled information (e.g., sps_bdpcm_enabled_flag) may be parsed/signaled from the SPS. Further, if the value of the transform skip enabled information (e.g., sps_transform_skip_enabled_flag) is 0, the BDPCM enabled information (e.g., sps_bdpcm_enabled_flag) may not be parsed/signaled from the SPS.

Further, based on the value of the BDPCM enabled information (e.g., sps_bdpcm_enabled_flag) in the SPS, the BDPCM flag information (e.g., intra_bdpcm_flag) on whether to apply the BDPCM to the current block) may be parsed/signaled through the coding unit syntax. In this case, if the value of the BDPCM enabled information (e.g., sps_bdpcm_enabled_flag) is 1, the BDPCM flag information (e.g., intra_bdpcm_flag) may be included in the coding unit syntax, and the BDPCM flag information (e.g., intra_bdpcm_flag) may be parsed/signaled from the coding unit syntax. Further, if the value of the BDPCM enabled information (e.g., sps_bdpcm_enabled_flag) is 0, the BDPCM flag information (e.g., intra_bdpcm_flag) may not be parsed/signaled from the coding unit syntax.

Further, as an example, the SPS may be configured to parse/signal information on the maximum block size (e.g., log 2_transform_skip_max_size_minus2) used in the transform skip mode based on the value of the transform skip enabled information (e.g., sps_transform_skip_enabled_flag). In this case, if the value of the transform skip enabled information (e.g., sps_transform_skip_enabled_flag) is 1, the information on the maximum block size (e.g., log 2_transform_skip_max_size_minus2) used in the transform skip mode may be included in the SPS, and the information (e.g., log 2_transform_skip_max_size_minus2) may be parsed/signaled from the SPS. Further, if the value of the transform skip enabled information (e.g., sps_transform_skip_enabled_flag) is 0, the information on the maximum block size (e.g., log 2_transform_skip_max_size_minus2) used in the transform skip mode may not be parsed/signaled from the SPS.

Further, as an example, based on the value of the transform skip enabled information (e.g., sps_transform_skip_enabled_flag) defined in the SPS, transform_skip_flag information (e.g., transform_skip_flag) on whether to apply the transform skip to the current block may be parsed/signaled through the transform unit syntax. In this case, if the value of the transform skip enabled information (e.g., sps_transform_skip_enabled_flag) is 1, the transform_skip_flag information (e.g., transform_skip_flag) may be included in the transform unit syntax, and the transform_skip_flag information (e.g., transform_skip_flag) may be parsed/signaled from the transform unit syntax. Further, if the value of the transform skip enabled information (e.g., sps_transform_skip_enabled_flag) is 0, the transform_skip_flag information (e.g., transform_skip_flag) may not be parsed/signaled from the transform unit syntax.

Further, for example, among the information related to the transform skip and/or the palette coding included in the SPS as described above, information having dependency may be defined with respect to the palette coding enabled information on whether the palette coding is enabled (e.g., sps_palette_enabled_flag). As an example, based on the value of the palette coding enabled information (e.g., sps_palette_enabled_flag) defined in the SPS, palette prediction mode flag information (e.g., pred_mode_plt_flag) on whether to apply the palette coding (palette prediction mode) to the current block may be parsed/signaled through the coding unit syntax. In this case, if the value of the palette coding enabled information (e.g., sps_palette_enabled_flag) is 1, the palette prediction mode flag information (e.g., pred_mode_plt_flag) may be included in the coding unit syntax, and the information (e.g., pred_mode_plt_flag) may be parsed/signaled from the coding unit syntax. Further, if the value of the palette coding enabled information (e.g., sps_palette_enabled_flag) is 0, the palette prediction mode flag information (e.g., pred_mode_plt_flag) may not be parsed/signaled from the coding unit syntax.

Further, for example, as described above, among the information related to the transform skip and/or the palette coding included in the SPS, information having dependency may be defined with respect to the transform skip enabled information (e.g., sps_transform_skip_enabled_flag) and/or the palette coding enabled information (e.g., sps_palette_enabled_flag).

As an example, in the SPS, based on at least one of the transform skip enabled information (e.g., sps_transform_skip_enabled_flag) and/or the palette coding enabled information (e.g., sps_palette_enabled_flag), the minimum quantization parameter information (e.g., min_qp_prime_ts_minus4) related to the minimum allowed quantization parameter for the transform skip mode may be parsed/signaled. In other words, based on the condition that the value of the transform skip enabled information (e.g., sps_transform_skip_enabled_flag) is 1, or the value of the palette coding enabled information (e.g., sps_palette_enabled_flag) is 1, the minimum quantization parameter information (e.g., min_qp_prime_ts_minus4) may be included in the SPS, and only in case that the above condition is satisfied, the minimum quantization parameter information (e.g., min_qp_prime_ts_minus4) may be parsed/signaled.

Here, as described above, the minimum quantization parameter information (e.g., min_qp_prime_ts_minus4) may be information related to the minimum allowed quantization parameter for the transform skip mode, and based on this, the quantization parameter for the current block may be derived.

For example, in case that the transform skip mode is applied to the current block, the quantization parameter for the current block may be derived based on the minimum quantization parameter information (e.g., min_qp_prime_ts_minus4), and the dequantized transform coefficient (scaled transform coefficient) may be derived by performing a dequantization process (scaling process) based on the quantization parameter. Based on the dequantized transform coefficient, the residual sample of the current block may be derived.

Further, for example, in case that the palette coding mode is applied to the current block, the quantization parameter for an escape value of the current block may be derived based on the minimum quantization parameter information (e.g., min_qp_prime_ts_minus4). In this case, the escape value of the current block may be derived by performing the dequantization (scaling process) based on the quantization parameter. Based on the escape value, the reconstructed sample of the current block may be generated. The process in which the palette coding mode is applied may be performed as disclosed in Table 4 and Table 5 above.

The decoding apparatus may derive a residual sample for the current block based on residual information (S1310).

As an embodiment, the decoding apparatus may obtain the residual information included in the image information. As described above, the residual information may include the value information of quantized transform coefficients, the location information, the transform technique, the transform kernel, and the quantized parameter information. The decoding apparatus may derive the quantized transform coefficients for the current block based on the quantized transform coefficient information included in the residual information, and may derive the transform coefficients based on the quantized transform coefficients. Further, the decoding apparatus may derive residual samples based on the transform coefficients.

Further, in deriving the residual samples, the decoding apparatus may determine whether to apply the transform or the transform skip mode to the current block based on the transform skip enabled information.

As described above, the transform skip enabled information may be information on whether the transform skip is enabled, and may be represented as the sps_transform_skip_enabled_flag syntax element as disclosed in Table 6 to Table 18 as above. For example, if the value of the sps_transform_skip_enabled_flag is 1, it may represent that the transform skip is enabled, and in this case, the transform_skip_flag may be parsed/signaled through the transform unit syntax. Here, the transform_skip_flag syntax element may represent whether the transform can be applied to the associated transform block. If the value of the sps_transform_skip_enabled_flag is 0, it may represent that the transform skip is not enabled, and in this case, the transform_skip_flag may not be parsed/signaled in the transform unit syntax. The transform skip enabled information (e.g., sps_transform_skip_enabled_flag) may be included in the SPS, and may be signaled from the encoding apparatus to the decoding apparatus. That is, based on that the value of the transform skip enabled information (e.g., sps_transform_skip_enabled_flag) included in the SPS is 1, the transform unit syntax may include the transform skip flag (e.g., transform_skip_flag). In this case, if the value of the transform skip flag (e.g., transform_skip_flag) included in the transform unit syntax is 1, a mode in which the transform is not applied (transform skip mode) may be performed for the current block. Further, if the value of the transform skip flag (e.g., transform_skip_flag) included in the transform unit syntax is 0, the transform may be applied for the current block.

For example, if the value of the transform skip enabled information is 1 (i.e., for the transform skip enabled information representing that the transform skip is enabled), the decoding apparatus may obtain the information on whether to apply the transform to the current block (transform skip flag) from the transform unit syntax, and may determine whether to apply the transform to the current block based on the value of the transform skip flag. For example, the transform skip mode may be applied to the current block of which the value of the transform skip flag is 1, and in this case, the decoding apparatus may derive the transform coefficients as the residual samples of the current block. Further, the transform may be applied to the current block of which the value of the transform skip flag is 0, and in this case, the decoding apparatus may derive the residual samples of the current block through inverse transform of the transform coefficients.

Further, with respect to the current block of which the value of the transform skip flag is 1 (i.e., transform skip mode), the decoding apparatus may derive the quantization parameter being used in the dequantization process based on the minimum quantization parameter information. Further, the decoding apparatus may derive the dequantized transform coefficients by performing the dequantization process based on the quantization parameter, and may derive the residual samples based on the dequantized transform coefficients.

Here, as described above, the minimum quantization parameter information may be information related to the minimum allowed quantization parameter for the transform skip mode, and may be included in the image information (e.g., SPS) based on at least one of the transform skip enabled information (e.g., sps_transform_skip_enabled_flag) and/or the palette coding enabled information (e.g., sps_palette_enabled_flag). For example, based on the condition that the value of the transform skip enabled information (e.g., sps_transform_skip_enabled_flag) is 1, or the value of the palette coding enabled information (e.g., sps_palette_enabled_flag) is 1, the minimum quantization parameter information (e.g., min_qp_prime_ts_minus4) may be included in the SPS. That is, only in case that the above condition is satisfied, the minimum quantization parameter information (e.g., min_qp_prime_ts_minus4) may be parsed/signaled.

The decoding apparatus may generate a reconstructed sample based on the residual sample (S1320).

As an embodiment, the decoding apparatus may obtain prediction information (e.g., prediction mode information) included in the image information. The decoding apparatus may determine whether to perform inter prediction or intra prediction for the current block based on the prediction information (e.g., prediction mode information), and may derive the prediction samples for the current block by performing the prediction in accordance with the determination as above.

Further, the decoding apparatus may generate the reconstructed samples based on the prediction samples and the residual samples. In this case, in accordance with the prediction mode, the decoding apparatus may directly use the prediction samples as the reconstructed samples, or may generate the reconstructed samples by adding the residual samples to the prediction samples. Further, the decoding apparatus may derive a reconstructed block or a reconstructed picture based on the reconstructed samples. Thereafter, as needed, the decoding apparatus may apply the in-loop filtering procedure, such as the deblocking filtering and/or SAO procedure, to the reconstructed picture in order to improve the subjective/objective image quality as described above.

In the above-described embodiments, the methods are explained on the basis of flowcharts by means of a series of steps or blocks, but the present document is not limited to the order of steps, and a certain step may be performed in order or step different from that described above, or concurrently with other steps. Further, it may be understood by a person having ordinary skill in the art that the steps shown in a flowchart are not exclusive, and that another step may be incorporated or one or more steps of the flowchart may be removed without affecting the scope of the present document.

The method according to the present document may be implemented in the form of software, and the encoding apparatus and/or decoding apparatus according to the present document may be included in an apparatus that performs image processing, such as TV, a computer, a smartphone, a set-top box, and a display apparatus.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the present document is applied may be produced in the form of a program executed by a computer and may be stored in a computer-readable recording medium. Multimedia data having a data structure according to the present document may also be stored in the computer-readable recording medium. The computer readable recording medium includes all kinds of storage devices and distributed storage devices in which computer readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 15:
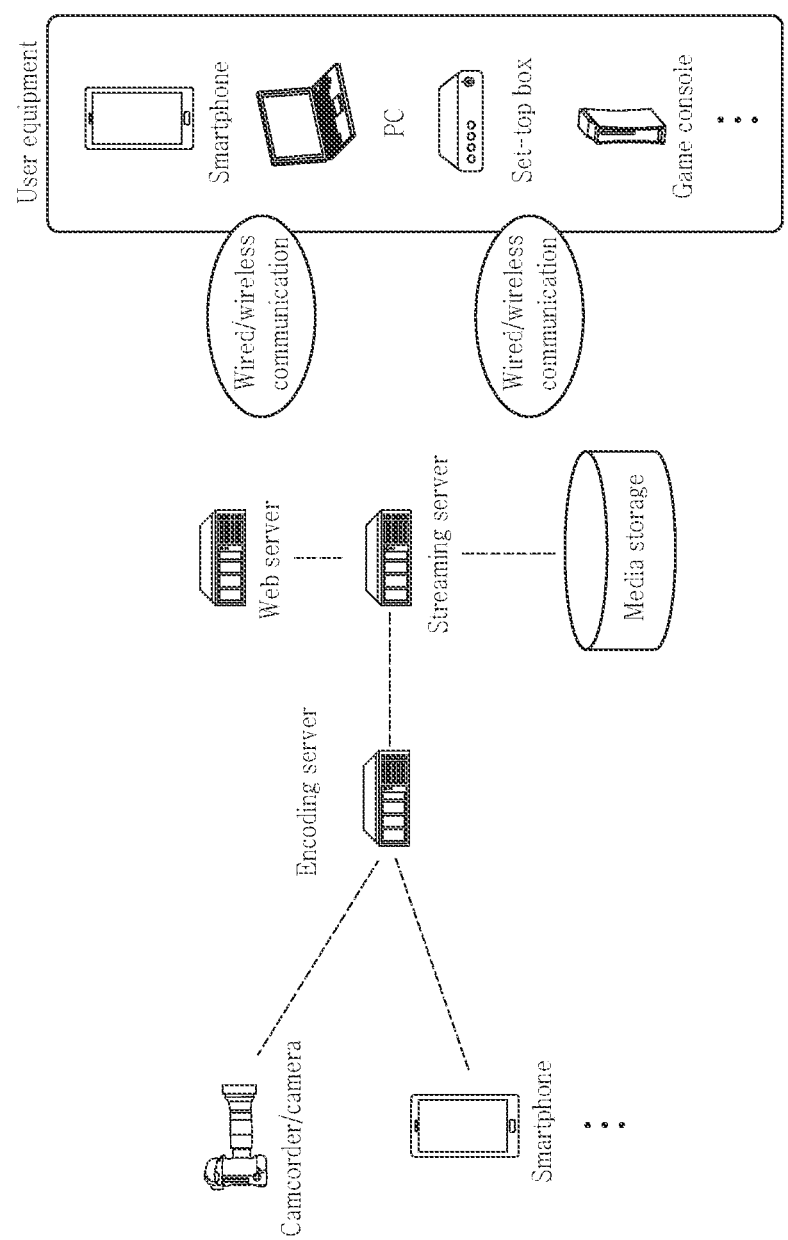
FIG. 15 illustrates an example of a content streaming system to which embodiments disclosed in the present document are applicable.

FIG. 15 illustrates an example of a content streaming system to which embodiments disclosed in the present document are applicable.

Referring to FIG. 15, the content streaming system applied to embodiments of the present document may briefly include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner. The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. An image decoding method performed by a decoding apparatus, the method comprising:
    obtaining image information including residual information from a bitstream;
    deriving a residual sample for a current block based on the residual information; and
    generating a reconstructed sample based on the residual sample,
    wherein the image information comprises a sequence parameter set (SPS),
    wherein the SPS comprises transform skip enabled information, palette coding enabled information, and minimum quantization parameter information related to a minimum allowed quantization parameter for a transform skip mode,
    wherein the SPS comprises block-based delta pulse code modulation (BDPCM) enabled information on whether the BDPCM is enabled based on the transform skip enabled information,
    wherein it is determined whether the SPS comprises the minimum quantization parameter information, based on at least one of the transform skip enabled information or the palette coding enabled information, wherein based on a condition that a value of the transform skip enabled information is 1 or a value of the palette coding enabled information is 1, the minimum quantization parameter information is comprised in the SPS, and wherein based on a condition that both the value of the transform skip enabled information and the value of the palette coding enabled information are 0, the minimum quantization parameter information is not comprised in the SPS,
    wherein whether to apply a transform to the current block is determined based on the transform skip enabled information, and
    wherein for the transform skip mode or a palette mode, the residual sample or an escape value is derived based on the minimum quantization parameter information.

2. An image encoding method performed by an encoding apparatus, the method comprising:
    deriving a residual sample for a current block;
    generating residual information based on the residual sample; and
    encoding image information including the residual information,
    wherein the image information comprises a sequence parameter set (SPS),
    wherein the SPS comprises transform skip enabled information, palette coding enabled information, and minimum quantization parameter information related to a minimum allowed quantization parameter for a transform skip mode,
    wherein the SPS comprises block-based delta pulse code modulation (BDPCM) enabled information on whether the BDPCM is enabled based on the transform skip enabled information,
    wherein it is determined whether the SPS comprises the minimum quantization parameter information, based on at least one of the transform skip enabled information or the palette coding enabled information, wherein based on a condition that a value of the transform skip enabled information is 1 or a value of the palette coding enabled information is 1, the minimum quantization parameter information is comprised in the SPS, and wherein based on a condition that both the value of the transform skip enabled information and the value of the palette coding enabled information are 0, the minimum quantization parameter information is not comprised in the SPS,
    wherein whether to apply a transform to the current block is determined based on the transform skip enabled information, and the transform skip mode is applied to the residual sample based on whether to apply the transform.

3. A non-transitory computer readable storage medium storing a bitstream generated by a method, the method comprising: deriving a residual sample for a current block, generating residual information based on the residual sample, and generating the bitstream by encoding image information including the residual information,
    wherein the image information comprises a sequence parameter set (SPS),
    wherein the SPS comprises transform skip enabled information, palette coding enabled information, and minimum quantization parameter information related to a minimum allowed quantization parameter for a transform skip mode,
    wherein the SPS comprises block-based delta pulse code modulation (BDPCM) enabled information on whether the BDPCM is enabled based on the transform skip enabled information,
    wherein it is determined whether the SPS comprises the minimum quantization parameter information, based on at least one of the transform skip enabled information or the palette coding enabled information, wherein based on a condition that a value of the transform skip enabled information is 1 or a value of the palette coding enabled information is 1, the minimum quantization parameter information is comprised in the SPS, and wherein based on a condition that both the value of the transform skip enabled information and the value of the palette coding enabled information are 0, the minimum quantization parameter information is not comprised in the SPS,
    wherein whether to apply a transform to the current block is determined based on the transform skip enabled information, and the transform skip mode is applied to the residual sample based on whether to apply the transform.

* * * * *